US010318164B2

(12) United States Patent
De

(10) Patent No.: US 10,318,164 B2
(45) Date of Patent: Jun. 11, 2019

(54) PROGRAMMABLE INPUT/OUTPUT (PIO) ENGINE INTERFACE ARCHITECTURE WITH DIRECT MEMORY ACCESS (DMA) FOR MULTI-TAGGING SCHEME FOR STORAGE DEVICES

(71) Applicant: Western Digital Technologies, Inc., Irvine, CA (US)

(72) Inventor: Arup De, Milpitas, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 240 days.

(21) Appl. No.: 15/355,851

(22) Filed: Nov. 18, 2016

(65) Prior Publication Data

US 2017/0147233 A1 May 25, 2017

Related U.S. Application Data

(60) Provisional application No. 62/257,510, filed on Nov. 19, 2015.

(51) Int. Cl.
*G06F 3/00* (2006.01)
*G06F 3/06* (2006.01)
(Continued)

(52) U.S. Cl.
CPC ............ *G06F 3/061* (2013.01); *G06F 3/0656* (2013.01); *G06F 3/0685* (2013.01);
(Continued)

(58) Field of Classification Search
CPC ....................................................... G06F 3/061
See application file for complete search history.

(56) References Cited

U.S. PATENT DOCUMENTS 8,200,857 B2 * 6/2012 Noeldner ................ G06F 12/00
 370/466
8,335,896 B1 12/2012 Smith
(Continued)

OTHER PUBLICATIONS

Seshadri, "Software Defined SSD: An Architecture to Generalize Date Processing in SSDs", 2013, Retrieved from http://escholarship.org/uc/item/0rh5q183#page-1, 44 pgs. Applicant points out, in accordance with MPEP 609.04(a), that the year of publication, 2013, is sufficiently earlier than the effective U.S. filing date, Nov. 18, 2016, so that the particular month of publication is not in issue.
(Continued)

*Primary Examiner* — Tammara R Peyton
(74) *Attorney, Agent, or Firm* — Patterson & Sheridan, LLP; Steven VerSteeg

(57) ABSTRACT

In general, techniques are described by which to provide an interface architecture for storage devices. A storage device comprising non-volatile memory, and a hardware controller may be configured to perform various aspects of the techniques. The hardware controller may be configured to read from or write to one or more data registers in a host device to provide a direct communication channel between each of one or more threads executed by one or more processors of the host device and the hardware controller. The hardware controller may further be configured to send a plurality of commands received from the direct communication channel into a hardware queue, and issue access requests based on the plurality of commands to read data from or write data to the non-volatile memory.

26 Claims, 25 Drawing Sheets

(51) Int. Cl.
*G06F 13/28* (2006.01)
*G06F 13/16* (2006.01)
*G06F 13/42* (2006.01)

(52) U.S. Cl.
CPC .......... *G06F 13/1673* (2013.01); *G06F 13/28* (2013.01); *G06F 13/4234* (2013.01); *G06F 13/4282* (2013.01); *Y02D 10/14* (2018.01); *Y02D 10/151* (2018.01)

(56) References Cited

U.S. PATENT DOCUMENTS

| | | | |
|---|---|---|---|
| 8,868,867 | B2 | 10/2014 | Swanson et al. |
| 9,116,623 | B2 | 8/2015 | Ashok et al. |
| 9,996,456 | B2 * | 6/2018 | Chung .................... G06F 13/16 |
| 2006/0031603 | A1 | 2/2006 | Bradfield et al. |
| 2008/0055322 | A1 | 3/2008 | Ryan et al. |
| 2009/0150894 | A1 | 6/2009 | Huang et al. |
| 2011/0292058 | A1 | 12/2011 | Herr et al. |
| 2013/0024595 | A1 | 1/2013 | Subramaniyan et al. |
| 2013/0086315 | A1 | 4/2013 | Kim |
| 2013/0132643 | A1 | 5/2013 | Huang |
| 2014/0129753 | A1 | 5/2014 | Schuette et al. |
| 2014/0281106 | A1 | 9/2014 | Saghi et al. |
| 2014/0281171 | A1 | 9/2014 | Canepa |
| 2015/0081956 | A1 | 3/2015 | Vucinic et al. |
| 2015/0106560 | A1 | 4/2015 | Perego et al. |

OTHER PUBLICATIONS

Akel, "Onyx: A Phase-Change Memory Storage Array", 2011, Retrieved from http://cseweb.ucsd.edu/~swanson/papers/OnyxThesis.pdf, 42 pgs. Applicant points out, in accordance with MPEP 609.04(a), that the year of publication, 2011, is sufficiently earlier than the effective U.S. filing date, Nov. 18, 2016, so that the particular month of publication is not in issue.

Mueller et al., "WoW: What the World of (Data) Warehousing Can Learn from the World of Warcraft," SIGMOD'13, Jun. 22-27, 2013, pp. 961-964 (4 pages).

U.S. Appl. No. 14/993,531, filed Jan. 12, 2016 by Arup De.

* cited by examiner

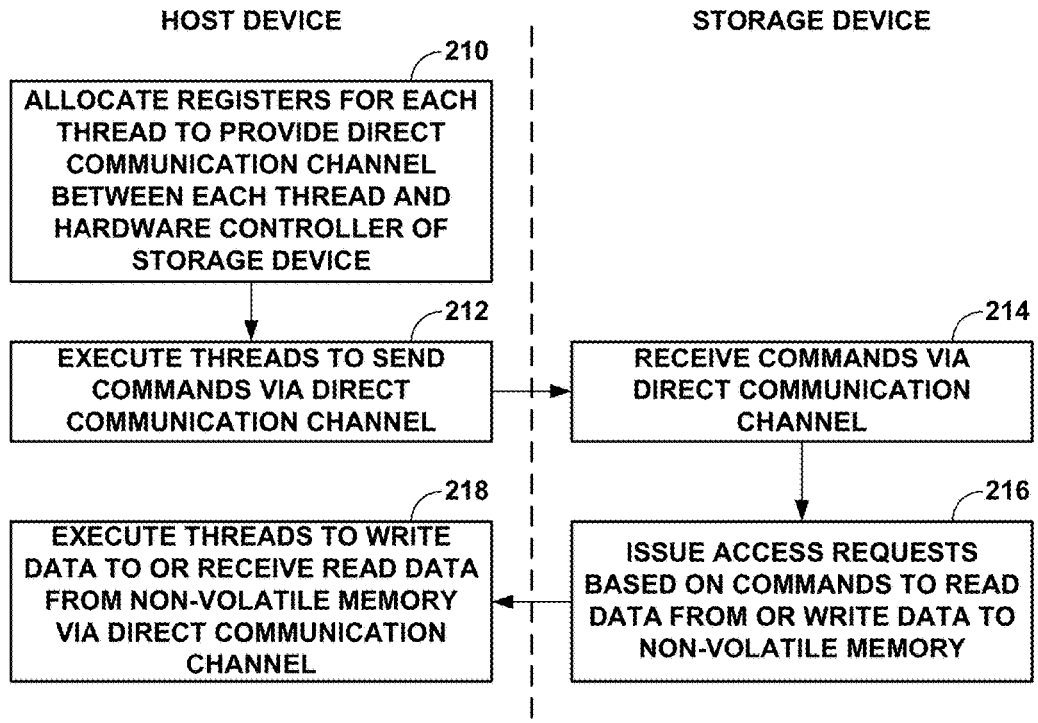
FIG. 19
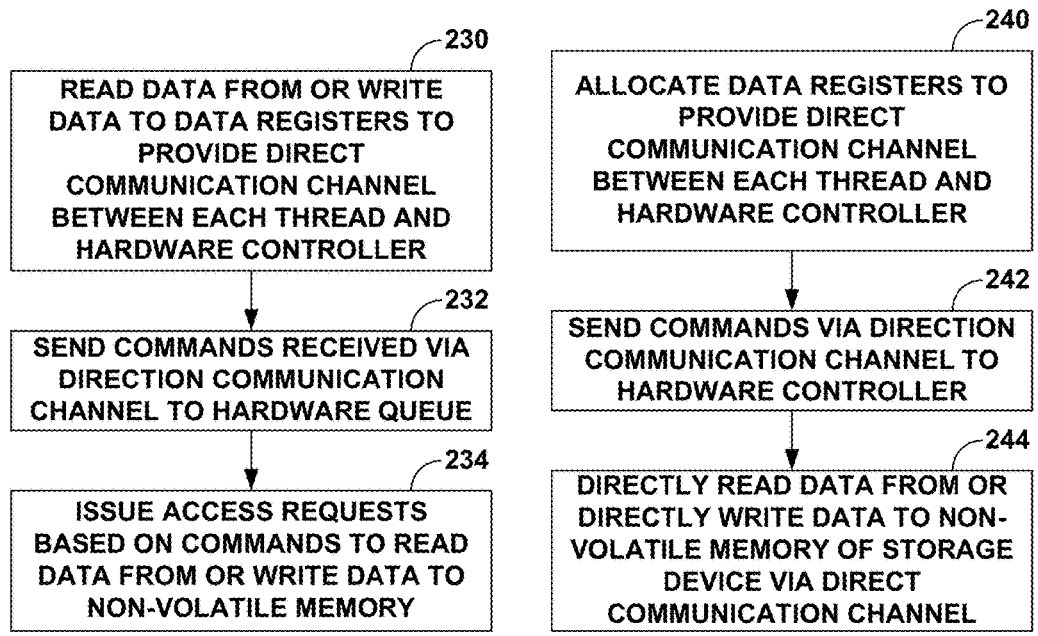
FIG. 20
FIG. 21

PROGRAMMABLE INPUT/OUTPUT (PIO) ENGINE INTERFACE ARCHITECTURE WITH DIRECT MEMORY ACCESS (DMA) FOR MULTI-TAGGING SCHEME FOR STORAGE DEVICES

This application claims the benefit of U.S. Provisional Application No. 62/257,510 filed Nov. 19, 2015, which is incorporated herein by reference in its entirety.

TECHNICAL FIELD

This disclosure relates to storage devices, and more particularly, to interface architectures for storage devices.

BACKGROUND

Storage devices may include solid-state drives (SSDs), which may be used in computers in applications where relatively low latency and high capacity storage are desired. For example, SSDs may exhibit lower latency, particularly for random reads and writes, than other types of storage devices, such as hard disk drives (HDDs). This may allow greater throughput for random reads from and random writes to a SSD compared to a HDD. Additionally, SSDs may utilize multiple, parallel data channels to read from and write to memory devices, which may result in high sequential read and write speeds.

Advancements in interfaces by which a host device may communicate with the SSD may allow greater amounts of data to be sent via a given period of time (or, in other words, provide more bandwidth) than previous interfaces provided. The improved interface bandwidth may not be fully leveraged by current SSDs due to architectural constraints that were not designed to accommodate the higher bandwidth. In some instances where the SSD architectural accommodates the higher bandwidth, the host device may be required to utilize processor cycles to manage reads and writes at the higher bandwidth, which impacts performance of the host device.

SUMMARY

In general, techniques are described by which to provide an interface architecture for storage devices.

In one aspect, the techniques are directed to a storage device comprising non-volatile memory and a hardware controller. The hardware controller may be configured to read from or write to one or more data registers in a host device to provide a direct communication channel between each of one or more threads executed by one or more processors of the host device and the hardware controller, store a plurality of commands received from the direct communication channel to a hardware queue, and issue access requests based on the plurality of commands to read data from or write data to the non-volatile memory.

In another aspect, the techniques are directed to a method comprises reading from or writing to, by a hardware controller of a storage device, one or more data registers in a host device to provide a direct communication channel for each of a plurality of threads executed by one or more processors of the host device, each of the direct communication channels enables direct communication between the respective one of the plurality of threads and the hardware controller, storing, by the hardware controller, a plurality of commands received from the direct communication channel to a hardware queue, and issuing, by the hardware controller, access requests based on the plurality of commands to read data from or write data to non-volatile memory of the storage device.

In another aspect, the techniques are directed to a storage device comprising means for reading from or writing to one or more data registers in a host device to provide a direct communication channel for each of a plurality of threads executed by one or more processors of the host device, each of the direct communication channels enables direct communication between the respective one of the plurality of threads and the hardware controller, means for storing a plurality of commands received from the direct communication channel to a hardware queue, and means for issuing access requests based on the plurality of commands to read data from or write data to non-volatile memory of the storage device.

In another aspect, the techniques are directed to a host device communicatively coupled to a storage device, the host device comprising one or more data registers, and one or more processors. The one or more processors may be configured to allocate the one or more data registers for each of one or more threads to provide a direct communication channel between each of the one or more threads and a hardware controller of the storage device, and execute the one or more threads to send a plurality of commands directly to the hardware queue via the direct communication channel, and directly read data from or directly write data to, in response to sending the plurality of commands, non-volatile memory of the storage device via the direct communication channel.

In another aspect, the techniques are directed to a method comprising allocating, by one or more processors of a host device, one or more data registers for each of a plurality of threads to provide a direct communication channel for each of the plurality of threads, each of the direct communication channels enables direct communication between the respective one of the plurality of threads and a hardware controller of a storage device, and executing, by the one or more processors, the plurality of threads to send a plurality of commands directly to the hardware queue via the direct communication channel, and directly read data from or directly write data to, in response to sending the plurality of commands, non-volatile memory of the storage device via the direct communication channel.

In another aspect, the techniques are directed to a system comprising a storage device and a host device. The storage device may comprise non-volatile memory, and a hardware controller. The host device may include one or more data registers, and one or more processors configured to allocate the one or more data registers for each of one or more threads to provide a direct communication channel between each of the one or more threads and the hardware controller of the storage device, and execute the one or more threads to send a plurality of commands directly to the hardware queue via the direct communication channel so as to directly read data from or directly write data to, in response to sending the plurality of commands, non-volatile memory of the storage device via the direct communication channel. The hardware controller may be configured to send the plurality of commands received from the direct communication channel into a hardware queue, and issue access requests based on the plurality of commands to read the data from or write the data to the non-volatile memory.

The details of the one or more examples discussed above are set forth in the accompanying drawings and the descrip-

BRIEF DESCRIPTION OF DRAWINGS

FIG. 19 is a flowchart illustrating example operation of the system shown in FIG. 3 in performing various aspects of the techniques described in this disclosure.

FIG. 20 is a flowchart illustrating example operation of the storage device shown in FIG. 3 in performing various aspects of the techniques described in this disclosure.

FIG. 21 is a flowchart illustrating example operation of the host device shown in FIG. 3 in performing various aspects of the techniques described in this disclosure.

DETAILED DESCRIPTION

Figure 1:
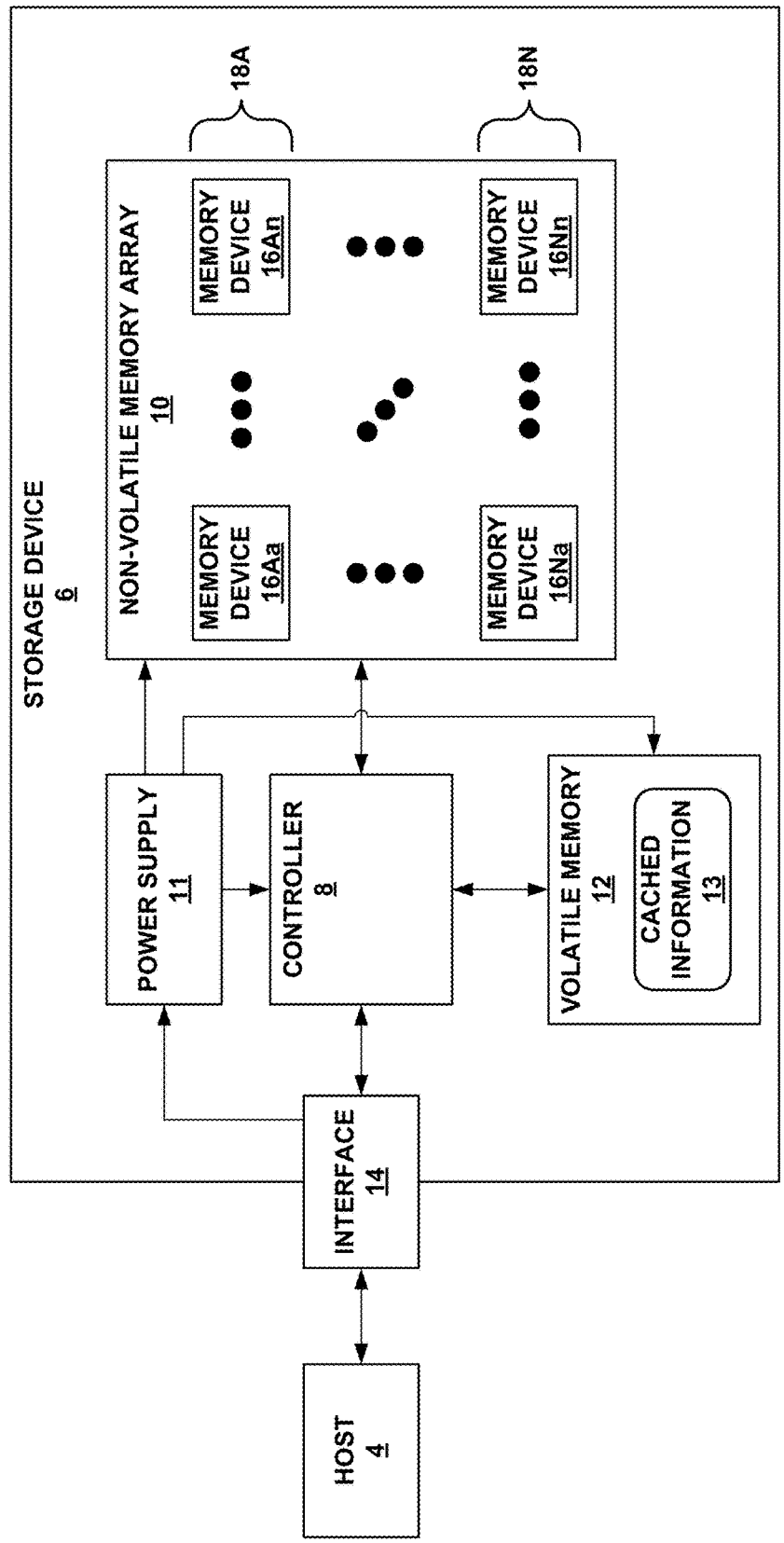
FIG. 1 is a conceptual and schematic block diagram illustrating an example storage environment in which a storage device may function as a storage device for a host device, in accordance with one or more techniques of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, that may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, storage device 6 may include a controller 8, non-volatile memory array 10 (NVMA 10), a power supply 11, a volatile memory 12, and an interface 14. In some examples, storage device 6 may include additional components not shown in FIG. 1 for the sake of clarity. For example, storage device 6 may include a printed board (PB) to which components of storage device 6 are mechanically attached and which includes electrically conductive traces that interconnect components of storage device 6; and the like.

In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel Arbitrated Loop (FCAL), small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. As illustrated in FIG. 1, power supply 11 may receive power from host device 4 via interface 14.

Storage device 6 may include NVMA 10 which may include a plurality of memory devices 16Aa-16Nn (collectively, "memory devices 16") which may each be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 6 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, spin-transfer torque memory devices, memristor devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 6 may write data to and read data from NAND flash memory devices at the page level and erase data from NAND flash memory devices at the block level.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16Nn may be grouped into first channel 18A, and memory devices 16Na-16Nn may be grouped into $N^{th}$ channel 18N.

The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18.

In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

In some examples, storage device 6 may include a number of memory devices 16 selected to provide a total capacity that is greater than the capacity accessible to host device 4. This is referred to as over-provisioning. For example, if storage device 6 is advertised to include 240 GB of user-accessible storage capacity, storage device 6 may include sufficient memory devices 16 to give a total storage capacity of 256 GB. The 16 GB of storage devices 16 may not be accessible to host device 4 or a user of host device 4. Instead, the additional storage devices 16 may provide additional blocks to facilitate writes, garbage collection, wear leveling, and the like.

Further, the additional storage devices 16 may provide additional blocks that may be used if some blocks wear to become unusable and are retired from use. The presence of the additional blocks may allow retiring of the worn blocks without causing a change in the storage capacity available to host device 4. In some examples, the amount of over-provisioning may be defined as $p=(T-D)/D$, wherein p is the over-provisioning ratio, T is the total storage capacity of storage device 2, and D is the storage capacity of storage device 2 that is accessible to host device 4.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source.

Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Controller 8 may, in this respect, represent a unit configured to interface with host 4 and interface with non-volatile memory array 10. Controller 8 may receive commands in the form of a command stream from host 4. These commands may conform to a standard for accessing storage devices, such as SCSI. Controller 8 may process these commands, translating the commands into the above noted messages for accessing non-volatile memory array 10. These commands may correspond to different types, such as verify, read, write, and write verify. Although typically referred to as a "verify" command in SCSI and other storage interfaces, the verify command may also be referred to as a "read verify command" to distinguish the "verify command" from and avoid confusion with the similarly named "write verify command."

The commands of the same type may be referred to herein as "command sub-streams." In other words, a command sub-stream may be referred to as a read verify command sub-stream, a read command sub-stream, a write command sub-stream and a write verify command sub-stream, each of which denotes a sub-stream having commands only of the designated type (i.e., read verify, read, write, or write verify in this example). The command stream may include commands of different types and controller 8 may identify these commands of different types and arrange them into the sub-streams through queuing or any of a number of other ways.

Although not shown in FIG. 1, controller 8 may include a host processor for interfacing with host 4 and a memory processor for interfacing with non-volatile memory array 10 (where this memory processor may also be referred to as a "NAND processor"). The host processor may comprise a general purpose processor, such as a central processing unit (CPU), or dedicated hardware, such as an application specific integrated circuit (ASIC). Likewise, the NAND processor may comprise a general purpose processor or dedicated hardware. It is assumed for purposes of illustration that the host processor represents a CPU that executes firmware and that the NAND processor is a dedicated hardware unit specifically configured to interface with non-volatile memory array 10. The techniques, however, are not limited to this specific example and should be understood to apply to any type of controller.

Driven by interest in data intensive applications, such as social networking applications, enterprise applications, scientific data processing applications, data mining application, etc., an interface by which to access storage device 6 and more specifically NVMA 10 have been developed that potentially increase the amount of data written to and retrieved from NVMA 10 per unit of time (which may be referred to as write bandwidth and read bandwidth respectively) in comparison to previous interfaces. Emerging NVMA technologies, such as the above noted phase change memory, spin-transfer torque memory and memristors, may also when paired with the new interface architectures facilitate the development of these data intensive applications.

These emerging NVMA technologies may provide a number of different characteristics that facilitate the development of the data intensive applications. For example, the emerging NVMA technologies may provide DRAM-like performance, while offering higher density that DRAM and offering low standby power consumption in comparison to DRAM. The emerging NVMA technologies may therefore replace current NVMA technologies, like DRAM, while providing potentially even faster data access and retrieval (which may generally be referred to as storage) than DRAM.

Pairing the improved interface with the emerging NVMA however may not provide the above noted benefits unless the entire interface architecture is capable of supporting the higher bandwidths without overly taxing (in terms of utilizing processor resources) the host device. In other words, the improved interface bandwidth may not be fully leveraged by SSDs due to architectural constraints that were not designed to accommodate the higher bandwidth. In some instances where the SSD architectural accommodates the higher bandwidth, the host device may be required to utilize processor cycles to manage reads and writes at the higher bandwidth, which impacts performance of the host device. Restated differently, emerging NVMAs may offer orders of magnitude higher performance than disk-based memory or even flash memory. Existing host software and hardware architectures may require dramatic changes to leverage the higher performance of the emerging NVMAs (including changes for small random accesses).

Figure 2:
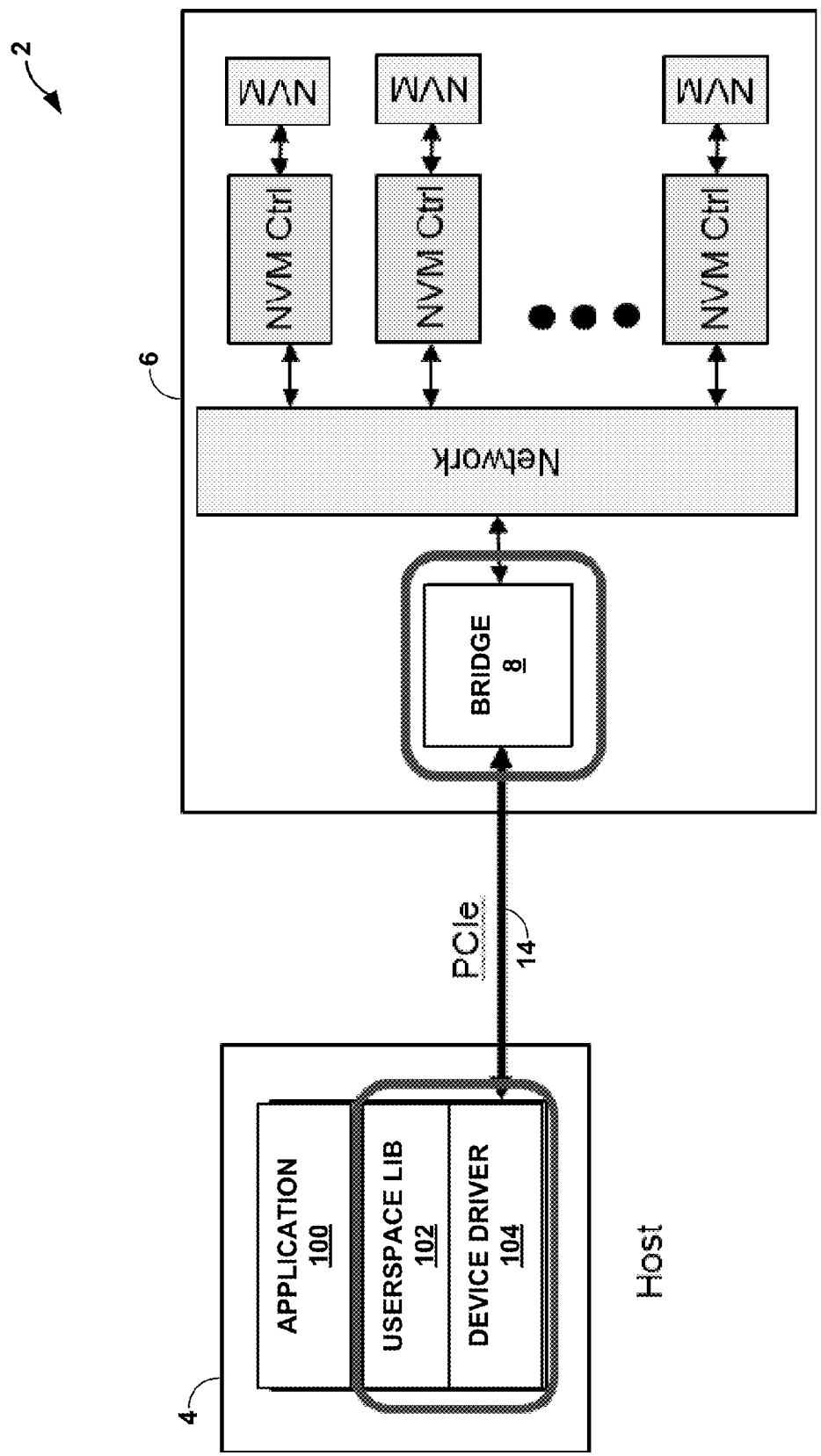
FIG. 2 is a diagram illustrating another example of storage environment shown in FIG. 1.

FIG. 2 is a diagram illustrating another example of storage environment 2 shown in FIG. 1. In the example of FIG. 2, host device 4 includes an application 100, a user space library 102 ("Userspace lib 102") and a device driver 104. User space library 102 and device driver 104 are used to interface with storage device 6 via interface 14, which is shown in the example of FIG. 2 to be a PCIe interface. Storage device 6 includes a bridge, which may be another way to refer to controller 8 shown in the example of FIG. 1. As such, controller 8 may also be referred to as bridge 8. The techniques of this disclosure may provide for changes to Userspace lib 102, device driver 104 and bridge 8.

More specifically, various aspects of the techniques described in this disclosure may provide a so-called "channel" for potentially faster communication between an application thread and storage device 6. To avoid confusion with the channels discussed above with respect to storage device 6, the "channel" provided by way of various aspects of the techniques described in this disclosure may be referred to as a "thread communication channel," as the "channels" of this disclosure provide an architecture to facilitate application thread communication between host device 4 (which executes the threads) and storage device 6.

The thread communication channel may comprise any combination of one or more command registers, one or more status registers, one or more direct memory access (DMA) queues, and a control structure. The command and status registers may comprise one or more base address registers, which are often denoted as BAR, that provide a PCI mechanism for mapping device memory into system address space) that may map (using a so-called "mmap" system call for example) to application space for programmed input/output (PIO) and DMA queues allocated by an operating system kernel executed by host device 4 (which are not shown in FIG. 2 for ease of illustration purposes) and map to application space by userspace library 102 for potentially quicker access. The DMA downstream queue may be configured to store write data, while the DMA upstream queue may be configured to store read data.

The techniques described in this disclosure may provide a command register per thread communication channel to issue input/output (I/O) read and write requests instead of employing a software command queue, thereby potentially removing one or more of queue related software overhead, multi-threaded synchronization and atomic shared memory access overhead. In some examples, the software command queue may require PCIe endpoint DMA to transfer data from memory of host 4 to storage device 6. Moreover, for small accesses (e.g., 8 bytes per request, 32 bytes per request or even 64 bytes per request), DMA may be more expensive that PIO. As such, the techniques may provide for a hardware queue and a hardware PIO engine for handling I/O requests ordering rather than manage I/O request ordering in software, thereby potentially reducing access latency.

In other words, the techniques may avoid one or more of a software command queue, sharing resources among threads to avoid synchronization and locks, small DMA accesses from a device, minimalizing PIO read and writes (e.g., BAR polling to check status, and doorbells), and context switches/interrupts. The techniques may, as described in more detail below, use PIO to send commands to the SSD, use advanced vector extension (AVX)—such as AVX2/AVX512—for 32 byte or 64 byte PIO/TLP, use DMA to transfer read and write data from storage device 6 to host 4 and host 4 to storage device 6, and use host memory polling for completion. The use of PIO may be premised upon the graph shown in FIG. 10.

Figure 10:
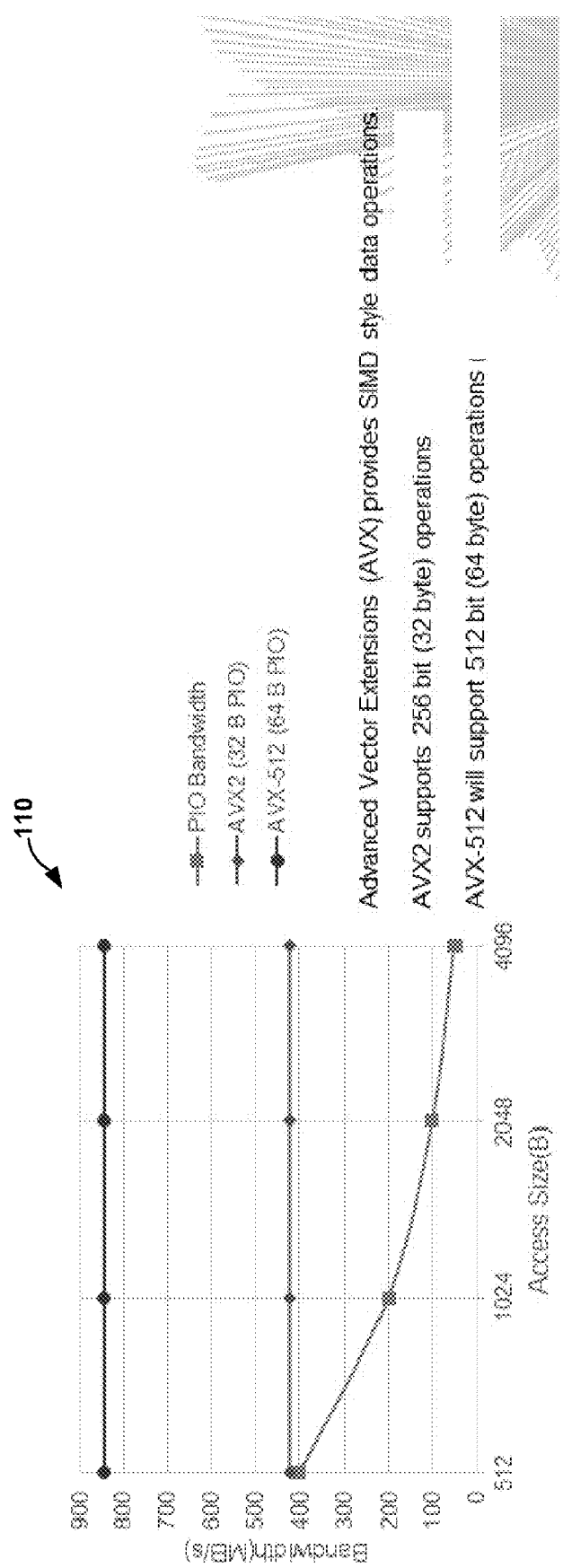
FIG. 10 is a diagram illustrating an example of how much PIO bandwidth may be needed considering advance vector extension (AVX).

FIG. 10 is a diagram illustrating a graph 110 showing an example of how much PIO bandwidth may be needed considering advance vector extension (AVX). Graph 110 illustrates that as the access size increases (X-axis), the bandwidth (Y-axis) of PIO decreases given the AVX 2 bandwidth and AVX 512 bandwidth. A PCIe Gen3 X8 interface may achieve a maximum read bandwidth of 6.3 gigabytes per second (6.3 GB/s). The access size may comprise 512 B while a command size may comprise 32B. A command may include a read/write command (1 bit), a source address (64-bits), a destination address (64 bits), a request size (32-bits), one or more tags (32-bits) and a reserved portion (63-bits). As such, a PIO bandwidth of 403.2 megabytes per second (MB/s) may be required (which equals 6.3*32/512). As such, graph 110 shows that PIO may be suitable for small relative access sizes (e.g., on the order of 512 B) but not potentially suitable for larger relative access sizes (e.g., on the order of 1024 B or 2048 B).

Figure 3:
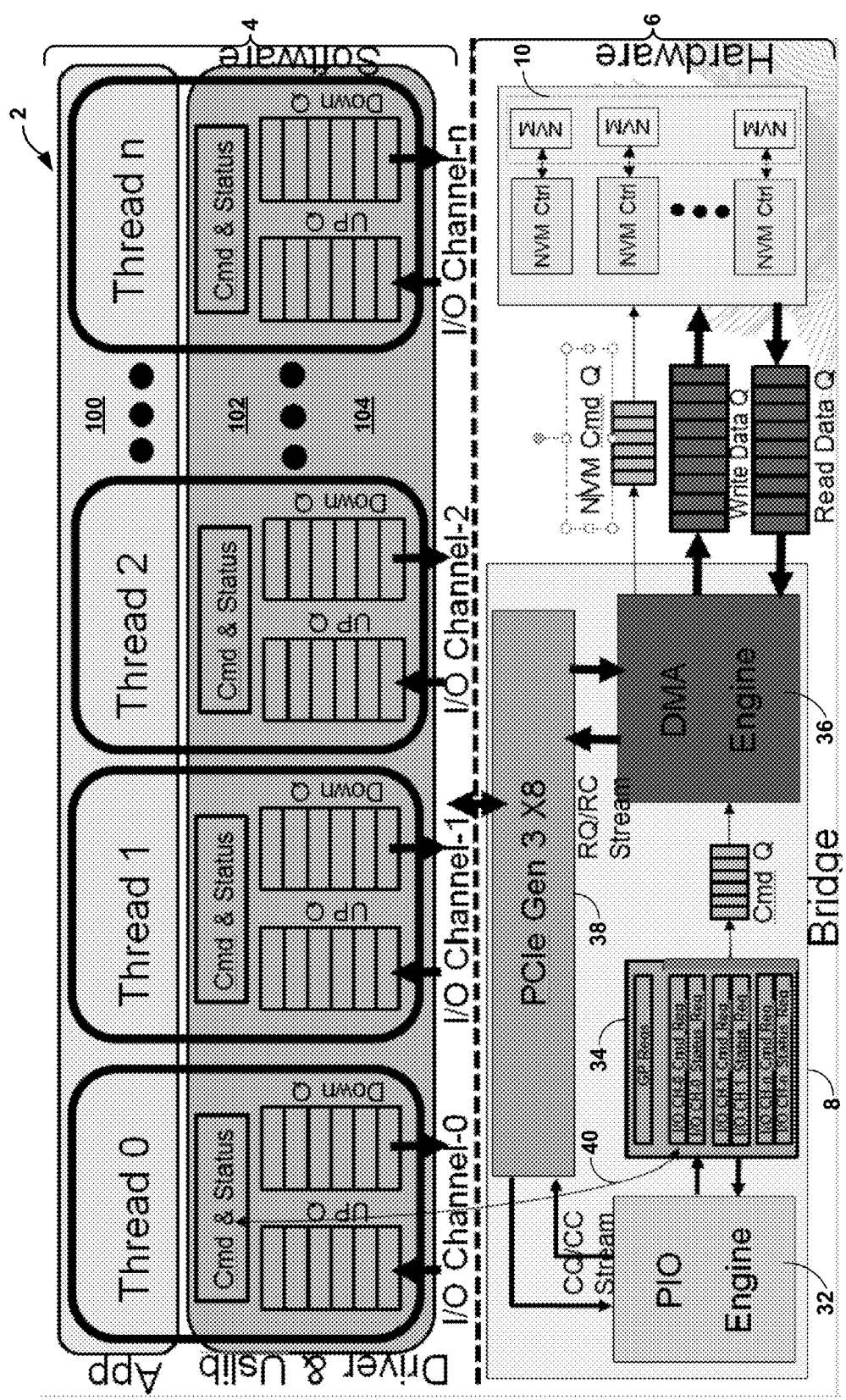
FIG. 3 is a diagram illustrating yet another example of storage environment configured to operate in accordance with the techniques described in this disclosure.

FIG. 3 is a diagram illustrating yet another example of storage environment 2 configured to operate in accordance with the techniques described in this disclosure. As shown in the example of FIG. 3, host 4 includes a driver that initializes the PCIe device (i.e., storage device 6 in the example of FIG. 3), allocates DMA queues, and implements custom mmap functionality for userspace access of BAR registers and DMA queues. Userspace library 102 may mmap storage device 6 and the DMA queues while also allocating thread communication channels 40 for each thread of the application. Userspace library 102 may further implement read and write functions.

As further shown in the example of FIG. 3, bridge 8 of storage device 6 includes a hardware PIO engine 32, command and status registers 34, hardware DMA engine 36, and interface controller 38 (which is shown as PCIe generation (Gen) 3 x8 and may also be referred to as "PCIe bridge 38"). PIO engine 32 may represent a hardware unit configured to handle command queuing. DMA engine 36 may represent a hardware unit configured to handle data transfer between host 4 and NVMA 10. The combination of the foregoing may form thread communication channel 40.

One potential problem with PCIe Gen 3 x8 is that PCIe Gen3 X8 receives data at a peak bandwidth of 8 gigabytes per second (GB/s) with a system clock of 250 megahertz (MHz). As the performance (in terms of bandwidth) of PCIe is increasing, the endpoint PCIe streaming interface may become wider (e.g., by adding more channels). The increasingly wider interface may result in more difficulties in terms of meeting the timing of controller 8 (which again may be referred to interchangeably as "bridge 8"), which may as one example comprise a Xilinx PCIe Gen3 X8. The Xilinx PCIe Gen3 x8 may provide a 256 bit wide streaming interface running at 250 MHz to support 8 GB/s peak bandwidth. For a given transaction layer packet (TLP), the number of data words (32-bit wide) may vary between 1 to 8 along with their position in each data beat (256 bit wide). The valid data check and reorganize of 32 bytes of data may take more than 8 cycles. Also, the valid data check and reorganize may require an extra buffer to keep the TLP data for offline processing and, when the buffer is full, the controller 8 may need to halt the PCIe receive (RX) engine.

Various aspects of the techniques described in this disclosure may provide an inline high performance data reorganization engine within bridge 8 to perform valid data search and compute destination indexes in parallel to potentially improve performance and avoid offline processing. In other words, bridge 8 may include an inline data reorganization engine for PCIe Gen3 attached NVM-based SSD.

That data reorganization (which may be abbreviated as "reorg") engine may support sustainable bandwidth of 8 GB/s, while potentially ensuring proper alignment and reorganization of data in inline fashion without 1) using a store buffer and 2) offline reorganization processes. Bridge 8 may also parallelize valid data words search in a given beat (which may be 256 bits wide) and compute the destination location for each data word. Bridge 38 may use a 2 stage pipelined logic with clock frequency of 250 MHz for valid data search and write data to the destination location.

In operation, thread 0 of threads 100 may first write a Read command to the command (cmd) register of driver 104 using AVX2. Driver 104 may, response to writing the Read command, send the Read command to PIO engine 32 over the PCIe interface. In response to the Read command, PIO engine 32 may dispatch the Read command to hardware cmd queue 34. DMA hardware engine 36 may, when servicing hardware cmd queue 34, send a PCM Read command to different controllers 8. Controller 8 may process the PCM Read command, reading data (so-called "read data") from PCM arrays 10. DMA hardware engine 36 may receive the read data, and transfer the read data to a queue maintained by driver 104 along with a completion signature using DMA. Driver 104 may check the completion signature, and when the completion signature matches that of the Read command, send the read data to the user buffer.

Figure 4:
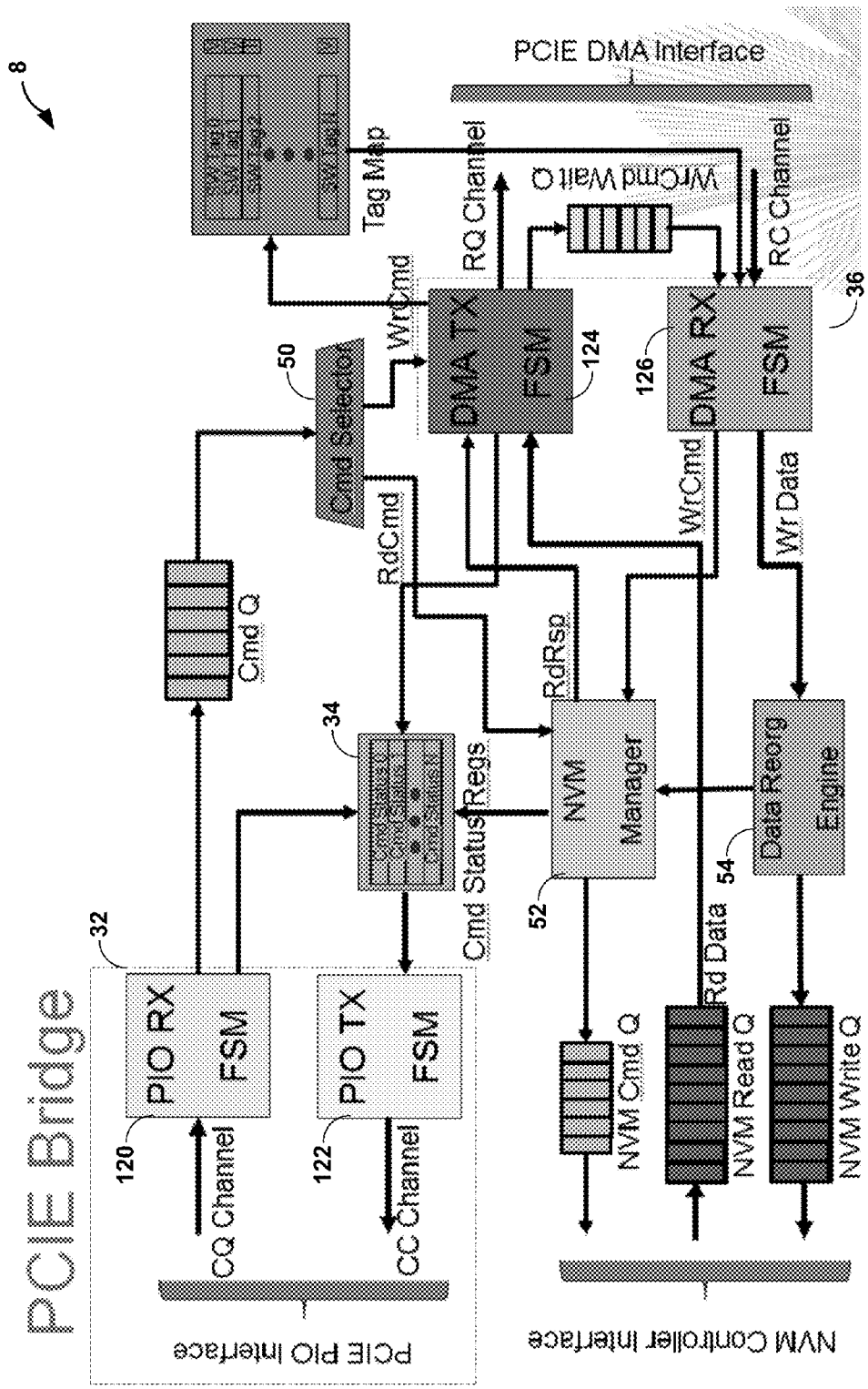
FIG. 4 is a diagram illustrating an example of the bridge of FIG. 3 in more detail.

FIG. 4 is a diagram illustrating an example of the bridge of FIG. 3 in more detail. Bridge 8 may implement as one example a PCIe Gen 3 x8 controller (and may be referred to as "PCIe bridge 8"). PCIe Gen 3 x8 is one example of an advanced interface that may provide two pairs of advanced extensible interface (AXI) stream interfaces. When implementing the PCIe Gen 3 x8 interface, interface controller 38 may provide a first AXI stream requester interface (shown as RQ/RC streams in FIG. 3 and RQ channel and RC channel in FIG. 4), which may provide a DMA interface for DMA engine 36. Interface controller 38 may also provide a second completer interface (shown as CQ-CC in FIG. 3 and CQ channel and CC channel in FIG. 4), which may provide a PIO interface for PIO engine 32. The requester interface may allow storage device 6 to use DMA to fetch a block of data from the memory of host 4 to storage device 6 and write a block of data from storage device 6 to memory of host 4. The completer interface may allow host device 4 to use PIO to read from and write to command and status registers 34 (which may also be referred to as BAR registers 34) to issue commands and perform status checks.

PIO engine 32 may comprise two finite state machines (FSMs). A first PIO FSM denoted as "PIO RX FSM 120" may be configured to receive I/O requests and queue the I/O requests to a hardware queue. The second PIO FSM denoted as "PIO TX FSM 122" may be configured to return a requested status to host 4. DMA engine 36 also includes two FSMs. The first DMA FSM denoted as "DMA TX FSM 124" may be configured to send read response data to host 4 (read) and read requests to fetch data from host 4 to SSD 6 (write). The second DMA FSM denoted as "DMA RX FSM 126" may be configured to receive write data from host 4.

PCIe bridge 8 may also include a command ("cmd") selector 50. Cmd selector 50 may represent a hardware logic unit configured to extract a command from the command queue and dispatch a read request to NVM manager 52 to read data from PCM and write a request directly to DMA TX FSM 124. PCIe bridge 8 may also include NVM manager 52, which may be configured to deliver read data to DMA TX FSM 124 and receive a write request from DMA RX FSM 126.

As mentioned above, PCIe bridge 8 may further include a data reorganization engine, which is shown in the example of FIG. 4 as "data reorg engine 54." Data reorg engine 54 may be configured to performing one or more of the following three operations:

Search valid data words in a given databeat (32 bytes);
Find destination location and write the corresponding word; and
When a 32-byte window is full, dispatch data to NVM Write Data first-in, first-out (FIFO) (which may also be denoted as "NVM Write_Data_Fifo") queue.

Figure 5:
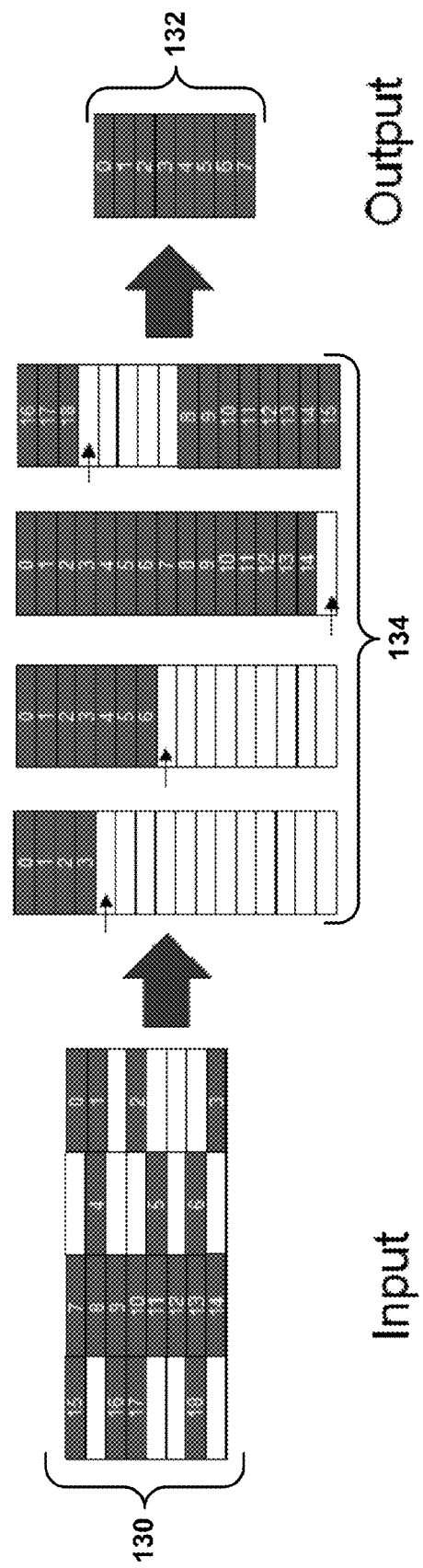
FIG. 5 is a diagram illustrating exemplary operation of the data reorg engine of FIG. 4 in performing one or more of the search, find and dispatch operations in accordance with various aspects of the techniques described in this disclosure.

FIG. 5 is a diagram illustrating exemplary operation of the data reorg engine of FIG. 4 in performing one or more of the search, find and dispatch operations in accordance with various aspects of the techniques described in this disclosure. The following represents pseudo-code defining "naïve" operation of the data reorg engine 54:

```
N = 8 // maximum number of datawords per beat
int data_reorg_conventional (uint32_t* data_in, uint8_t
valid, uint32_t* data_out,
    uint32_t last_index){
    uint32_t word_count = 0;
    for( int i = 0; i < N; i++) {
        if(valid[i]) {
            data_out[last_index+ word_count] = data_in[i];
            word_count = word_count + 1;
        }
    }
    return (last_index + word_count) % 2N
}
```

As shown in FIG. 5, data reorg engine 54 may receive as an input a PCIE RX DMA stream 130 comprising a number of different words (which are denoted as filled blocks having an index from 0 to 18. Each clock "beat" (which may refer to a change in the clock from a digital zero to a digital one or from a digital one to a digital zero), data reorg engine 54 may reorganize the words according to the index associated with each word. Data reorg engine 54 may, when space in internal queue 134 is insufficient to store additional words, output 8 words (considering that 8 words may be output per clock beat) to the NVM Write Fifo 132. Data reorg engine 54 may continue in this manner to reorganize words from DMA interface to facilitate writing of such data to NVMA 10.

Figure 6:
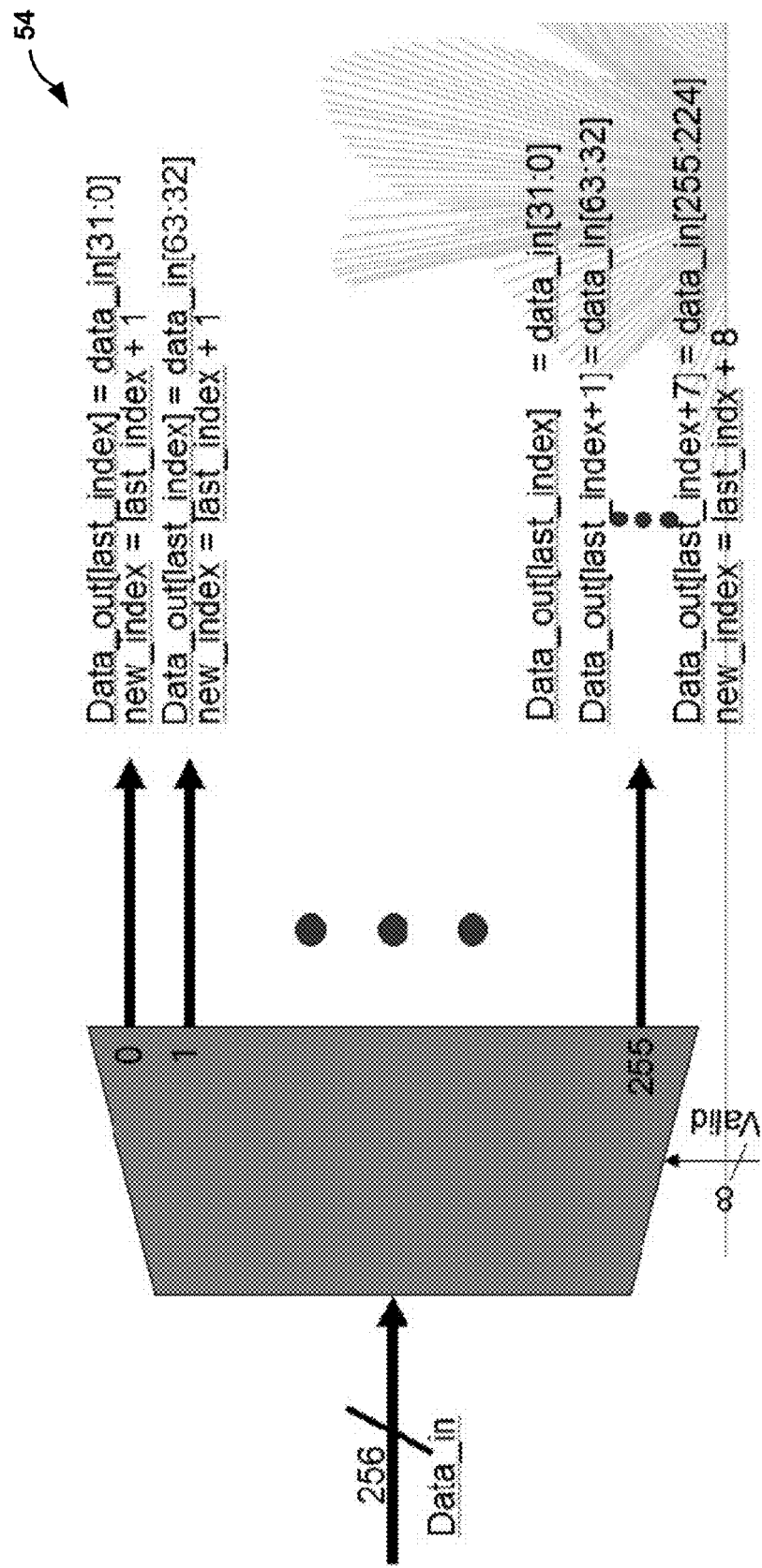
FIG. 6 is a diagram illustrating a de-multiplexer ("demux") based implementation of the data reorg engine of FIG. 4.

FIG. 6 is a diagram illustrating a de-multiplexer ("demux") based implementation of the data reorg engine of FIG. 4. In the example of FIG. 6, there may be a maximum of 8 data words per databeat, which may result in $2^8$ (or 256) possibilities of data representation. The implementation of the data reorg engine 54 may cover all 256 possibilities and provide higher performance than the naïve implementation but may require significantly more hardware resources than the naïve implementation.

Figure 7:
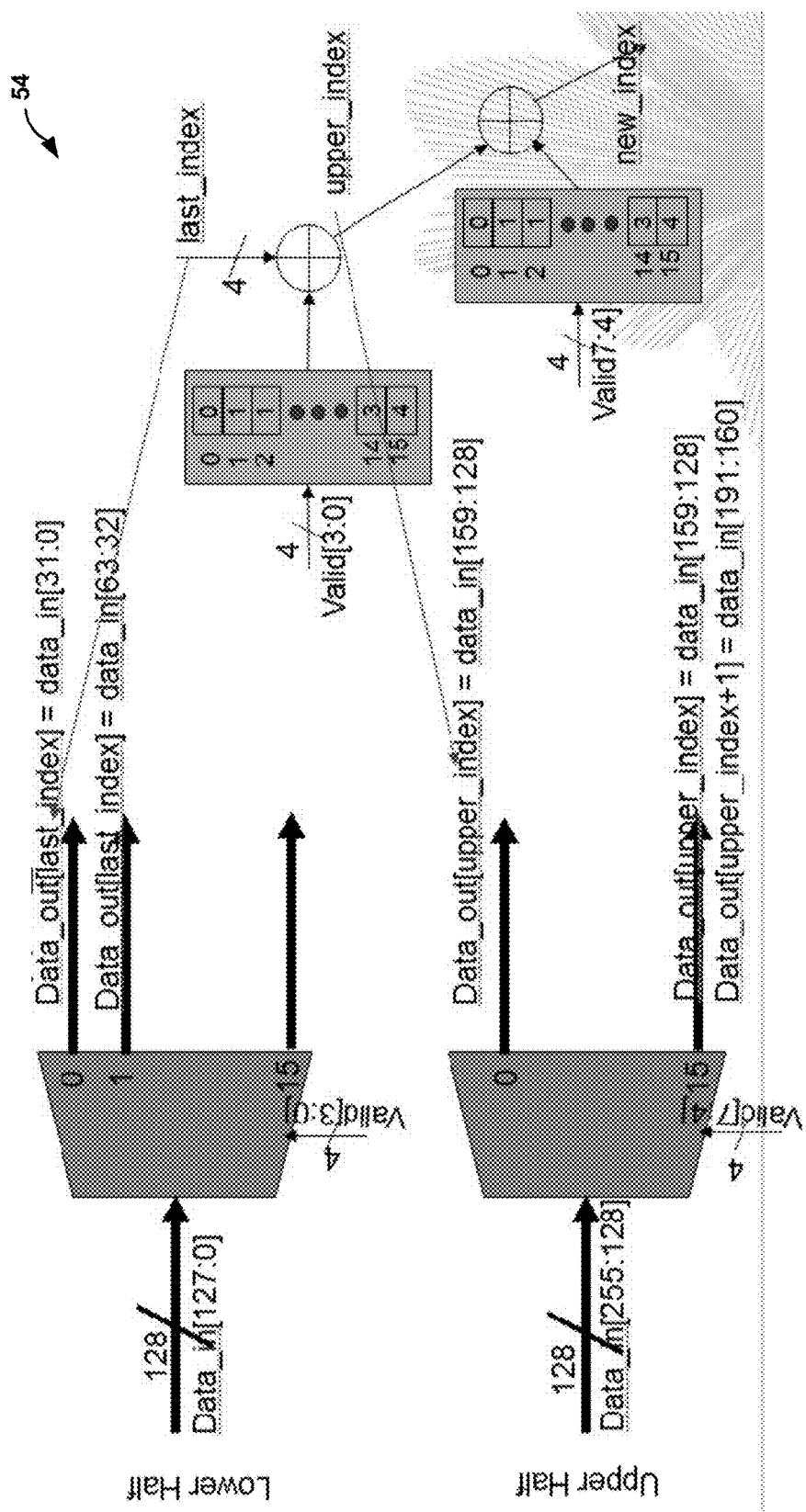
FIG. 7 is a diagram illustrating a dual demux-based implementation of the data reorg engine of FIG. 4.

FIG. 7 is a diagram illustrating a dual demux-based implementation of the data reorg engine of FIG. 4. The dual demux-based implementation of data reorg engine 54 may potentially optimize hardware resources utilization by using 2 smaller demux logic and lookahead upper_index computation.

Figure 8:
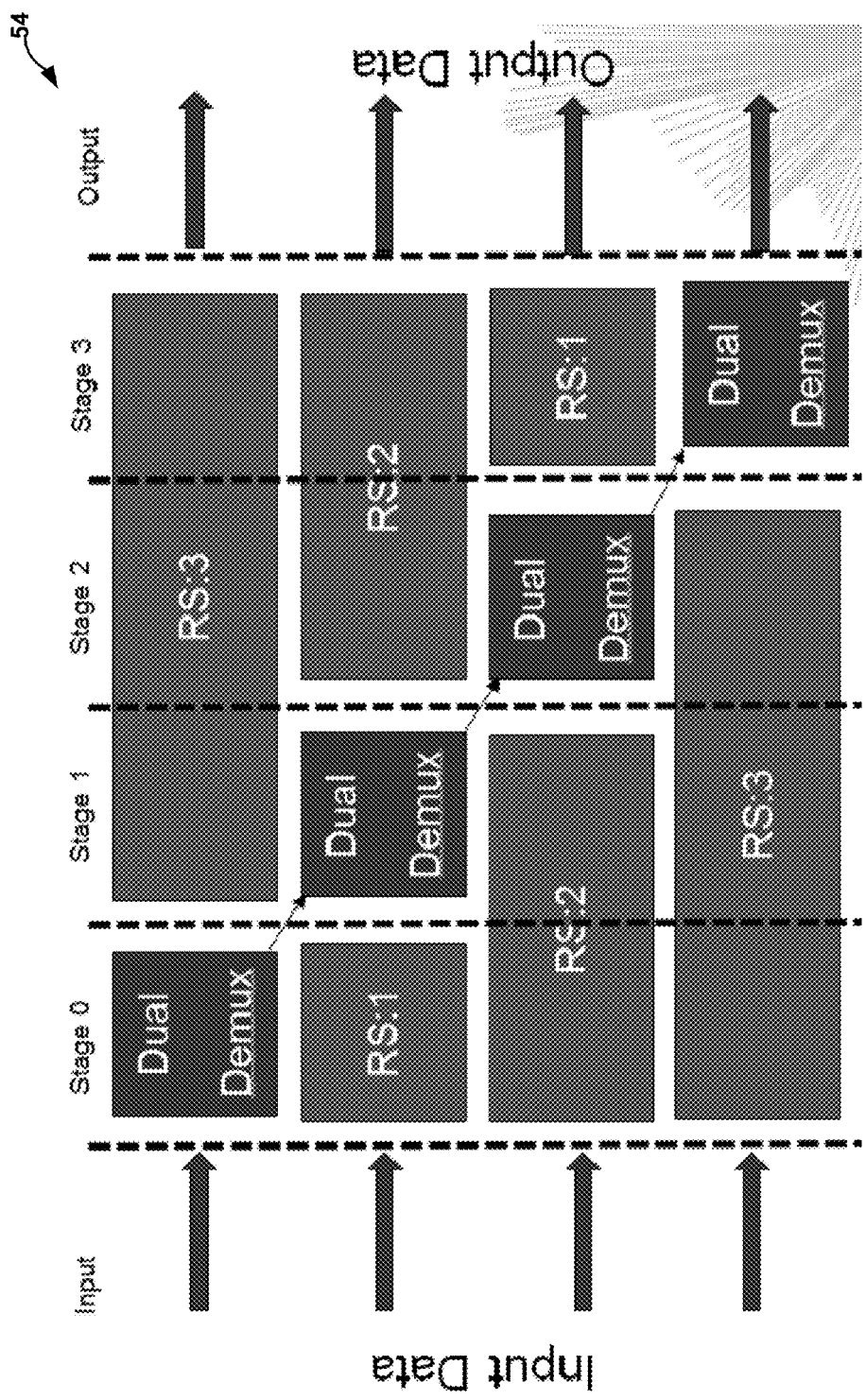
FIG. 8 is a diagram illustrating a pipelined dual demux-based implementation of the data reorg engine of FIG. 4.

FIG. 8 is a diagram illustrating a pipelined dual demux-based implementation of the data reorg engine of FIG. 4. The pipelined dual demux-based implementation of data reorg engine 54 shown in FIG. 8 may be provided for wider data processing (meaning data widths wider than 256). The pipelined implementation may chain dual demux-based implementations, such as that shown in FIG. 7, together to form the pipeline that may facilitate even more advanced interfaces, thereby potentially providing adaptability to future interfaces.

Another potential problem with PCIe interfaces is that PCIe BAR register polling or interrupts are often used for completion, which utilizes PCIe upstream and downstream small TLPs communications and degrades DMA performance as both PIO and DMA share the same differential pair for communications. The interrupts may cause data integrity issues (as the interrupt may come before data, meaning that the interrupt may overwrite data on the bus). The BAR register polling techniques may therefore reduce performance and increase latency.

Various aspects of the techniques described in this disclose provide for a signature based completion to potentially increase data integrity and improve performance. The signature-based completion techniques may allow for fast PCIe-attached PCM-based SSD. A Xilinx PCIe Gen 3 core of the PCIe bridge 8 may provide a streaming interface for DMA. A completion signature may be attached after read data to ensure data integrity. Using these signatures may removes PCIe BAR register polling, which may significantly reduce the upstream and downstream polling TLPs across PCIe while also potentially improving the overall DMA performance.

Another potential problem with regard to the interface architecture is that existing request schedulers may use software locks to ensure reliable scheduling of various I/O requests using a shared request queue. As NVMs may offer orders of magnitude higher performance than flash, the software overhead may become more than 70% of I/O latency.

To better utilize NVMAs 10, various aspects of the techniques described in this disclosure propose a multi-channel communication technique along with hardware support to potentially reduce software overhead. The techniques may provide for nearly lock-free request scheduling so as to potentially improve the performance of PCIe-attached emerging NVM based SSDs. The techniques may allocate the above described thread communication channel for each application thread rather than a shared software request queue to avoid locks and atomicity. The techniques may also provide a hardware queue manager for request ordering instead of software to improve performance. The hardware assisted multi-channel tagging scheme performed in accordance with various aspects of the techniques described in this disclosure may assign unique tags for each request in different channels to maintain order and avoid software locks during request scheduling.

In an example of the multi-channel tagging scheme, I/O requests may include a unique software tag comprising a unique channel identifier (ID) and sequence number (to maintain order in the same thread communication channel), where the software tag (SW_Tag) may be defined as SW_Tag={channel_ID, sequence_number}. The tagging mechanism may be local to a given channel, thereby potentially not requiring any global synchronization and locks. As a result of the Xilinx PCIe IP, which only supports 64 tags, the techniques may provide tag mapping logic to map from SW_Tag to PCIe_Tag (SW_Tag>>PCIe_tag). The techniques may allow for a tag memory (tag_mem) with 64 entries to maintain the software to PCIe tag mapping and track valid entries.

For write operations, DMA_TX_FSM 124 (shown in the example of FIG. 4) may write a SW_Tag of a given write request at PCIe_tag address and set a valid bit. DMA_TX_FSM 124 may then send the DMA read to PCIe over the PCIe RQ channel (write request). Upon receiving the write data over the PCIe RC channel with a given PCIe_tag, DMA_TX_FSM 124 retrieves the SW_tag from the tag_mem using the PCIe_tag. Upon completion, DMA_TX_FSM 124 may set a status bit of a given channel.

Figure 9:
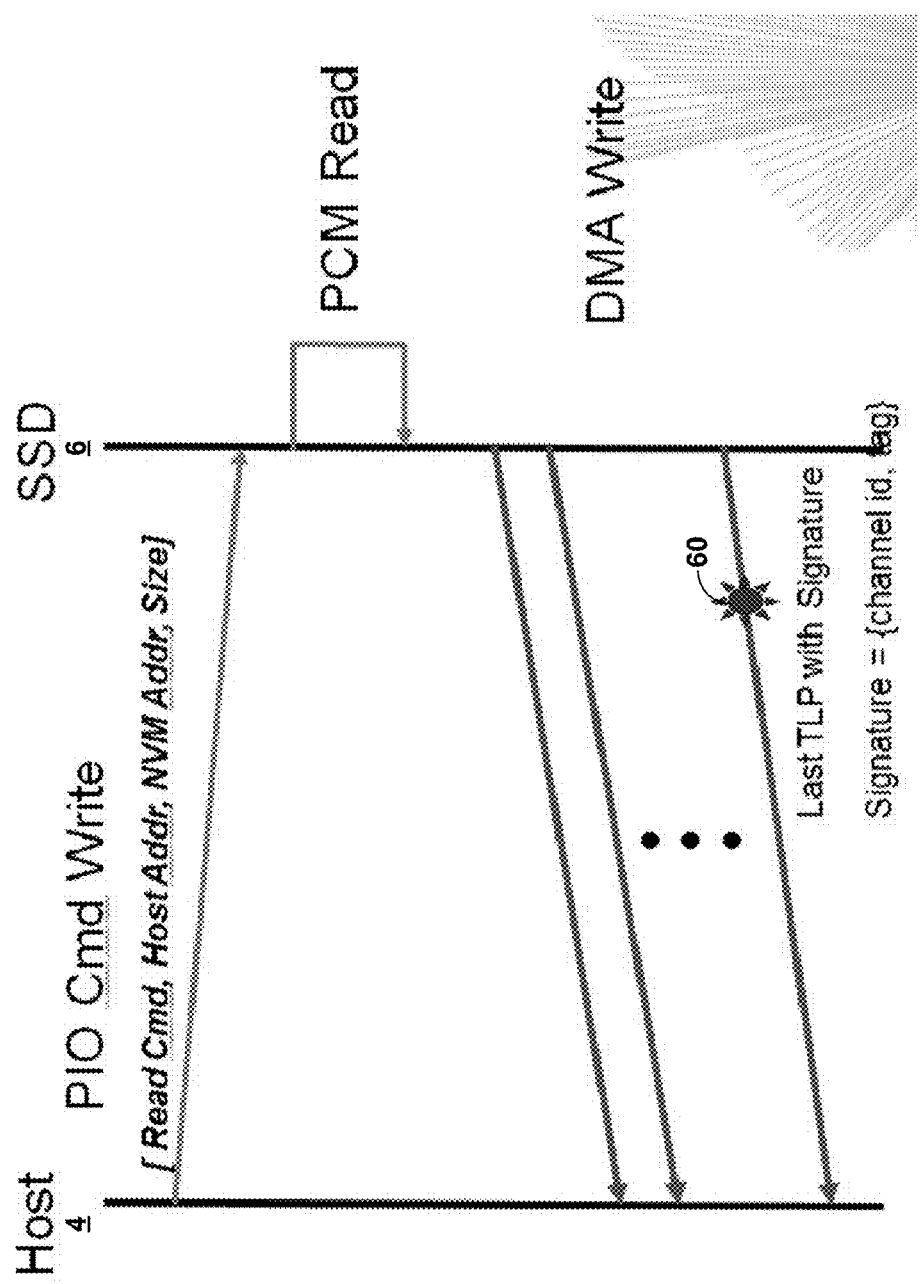
FIG. 9 is a diagram illustrating command based communications for a read using DMA in accordance with various aspects of the techniques described in this disclosure.

FIG. 9 is a diagram illustrating command based communications for a read using DMA in accordance with various aspects of the techniques described in this disclosure. In the example of FIG. 9, host 4 may issue a PIO write command (shown as "PIO Cmd Write") that specifies a read command ("Read Cmd"), a host address ("Host Addr") to which to write the data, a NVM address ("NVM Addr") from which to read the data, and a size of the data to be read. Storage drive 6 (shown as "SSD" in FIG. 9) may perform a PCM read and then perform a DMA write to write the read data into the memory of host 4. As shown in FIG. 9, the last packet has a signature 60, which DMA engine 36 may apply in accordance with the techniques described in this disclosure. The signature may include a channel id identifying the thread communication channel and a tag.

The following provides the application programming interface (API) that host 4 may expose for use by applications to access the interface architecture shown in FIG. 3 and thereby operate in accordance with the techniques described in this disclosure.

sscc_init( ) Mmap device to userspace, allocate and initialize data structures;

sscc_get_channel(sscc_channel_t* channel): Allocate and assign thread communication channel to application thread;

sscc_free_channel(sscc_channel_t* channel): Deallocate thread communication channel sscc_exit( ) Unmap device and deallocate datastructures;

sscc_read(sscc_channel_t* channel, void* buf, void* nvm_addr, uint64_t size): Read size data from nvm_addr through given thread communication channel and put it in buffer; and sscc_write(sscc_channel_t* channel, void* buf, void* nvm_addr, uint64_t size): Write size data from buffer to NVM through given thread communication channel.

The Read API may further be defined as follows:

```
int sscc_read(sscc_channel_t* channel, void* buf, void* nvm_addr,
uint64_t size) {
    // PIO Write to issue read command [rd_cmd, DMA Addr, NVM
    Addr, Size]
    sscc_write_reg(channel->cmd_reg, read_cmd) ;
    // Check signature
        while(get_signature(channel, read_cmd));
        // Get data
        memcpy(buf, channel->rq_ptr, size );
        return size;
}
```

Given that PCIe offers packet-based communication, various aspects of the techniques may embed a unique signature for each I/O request to ensure fast and reliable data completion.

The Write API may further be defined as follows:

```
int sscc_write(sscc_channel_t* channel, void* buf, void* nvm_addr,
uint64_t size) {
    // Write data
    memcpy(buf, channel->wq_ptr, size );
        // PIO Write to issue write command [write_cmd, seq_no, DMA
        Addr, NVM Addr,
Size]
```

```
    sscc_write_reg(channel->cmd_reg, write_cmd) ;
    //Check tag
        while(check_tag(channel, write_cmd));
            return size;
}
```

Figure 11A:
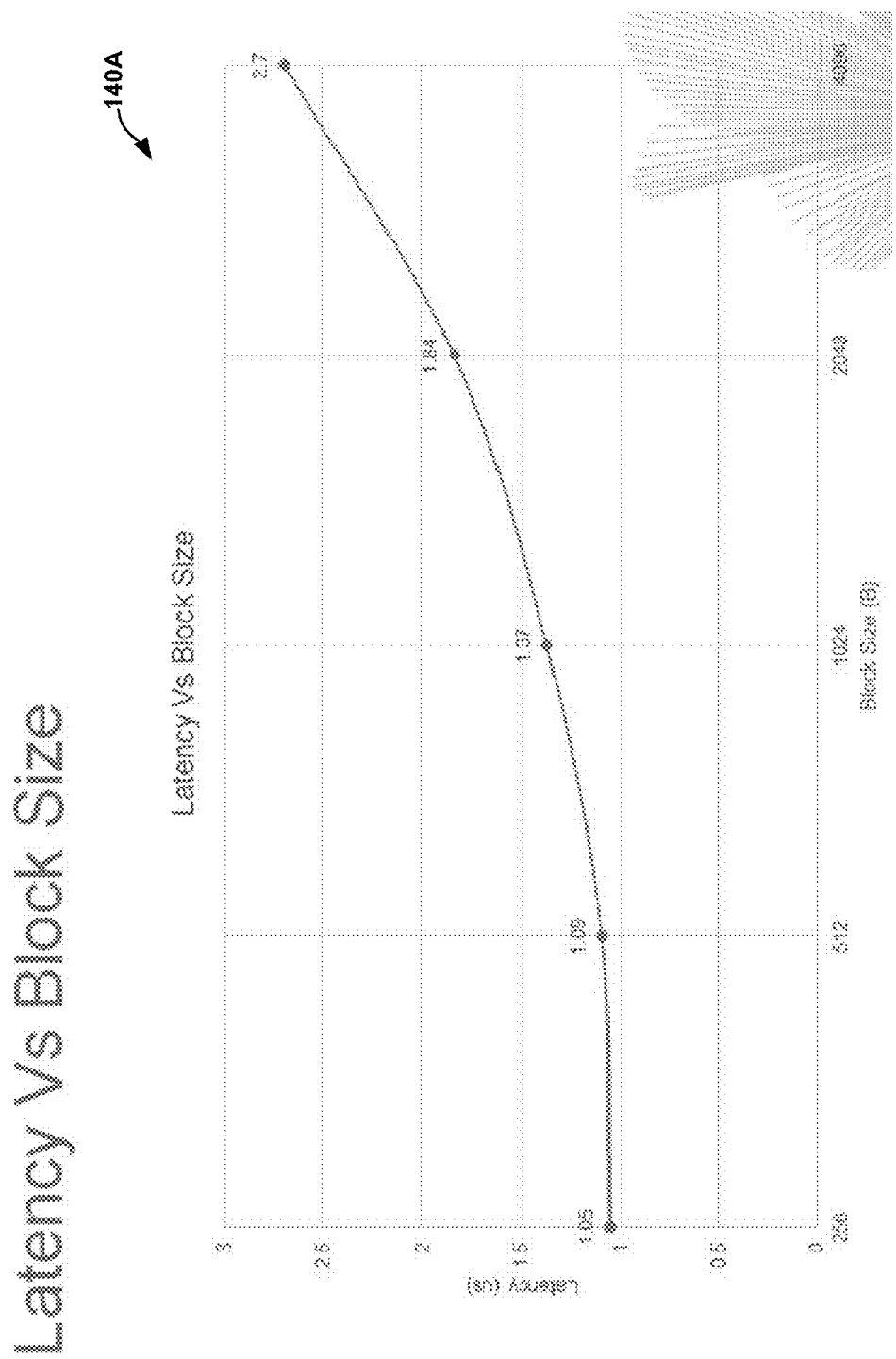
FIGS. 11A-11G are diagrams illustrating various graphs detailing the impact to a wide number of criteria of performing the above aspects of the techniques described in this disclosure.

FIGS. 11A-11G are diagrams illustrating various graphs 140A-140G detailing the impact to a wide number of criteria of performing the above aspects of the techniques described in this disclosure. In FIG. 11A, graph 140A shows the impact of the techniques to latency as a function of block size, where latency (Y-axis) increases only marginally as block size (X-axis) increases.

Figure 11B:
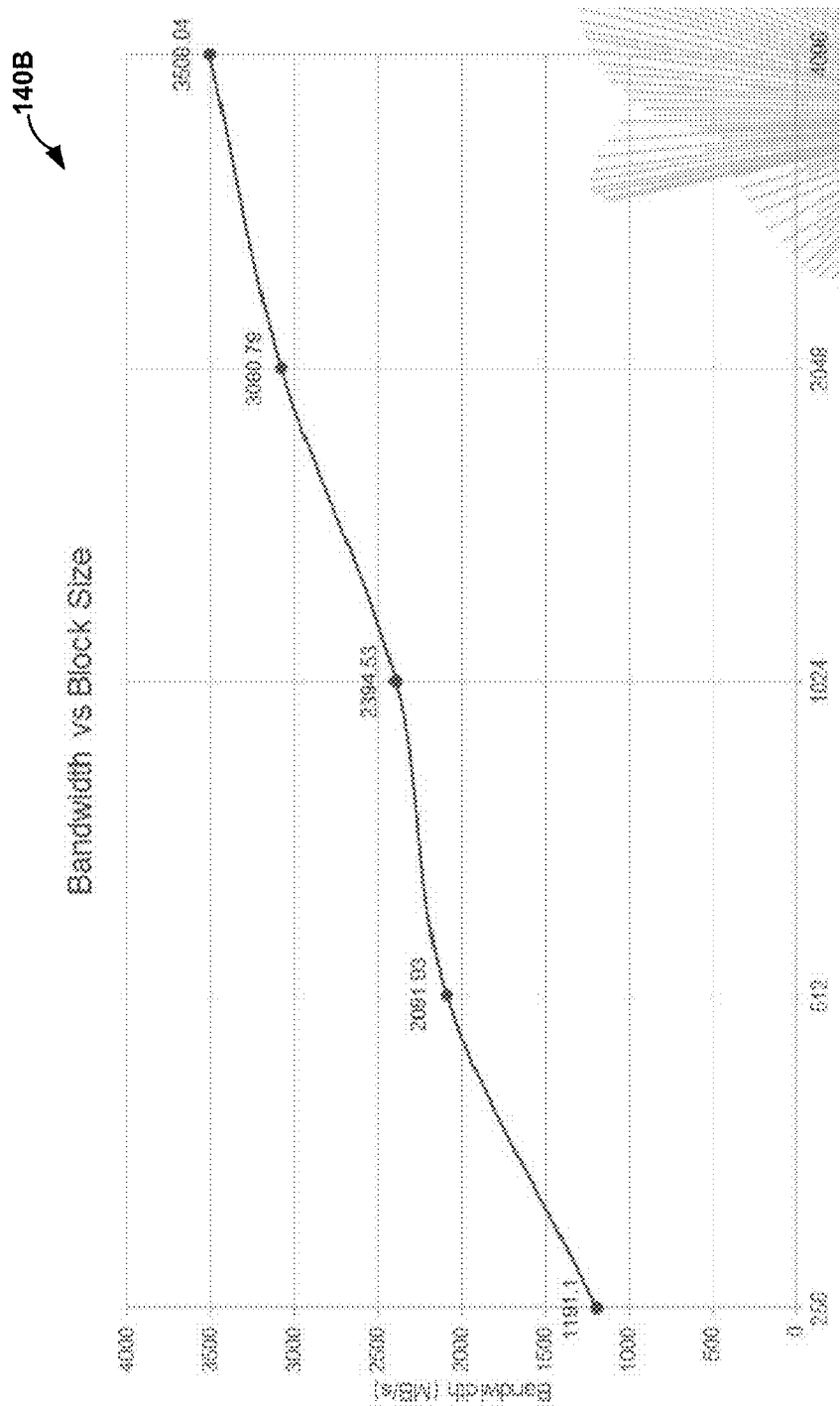
Figure 11C:
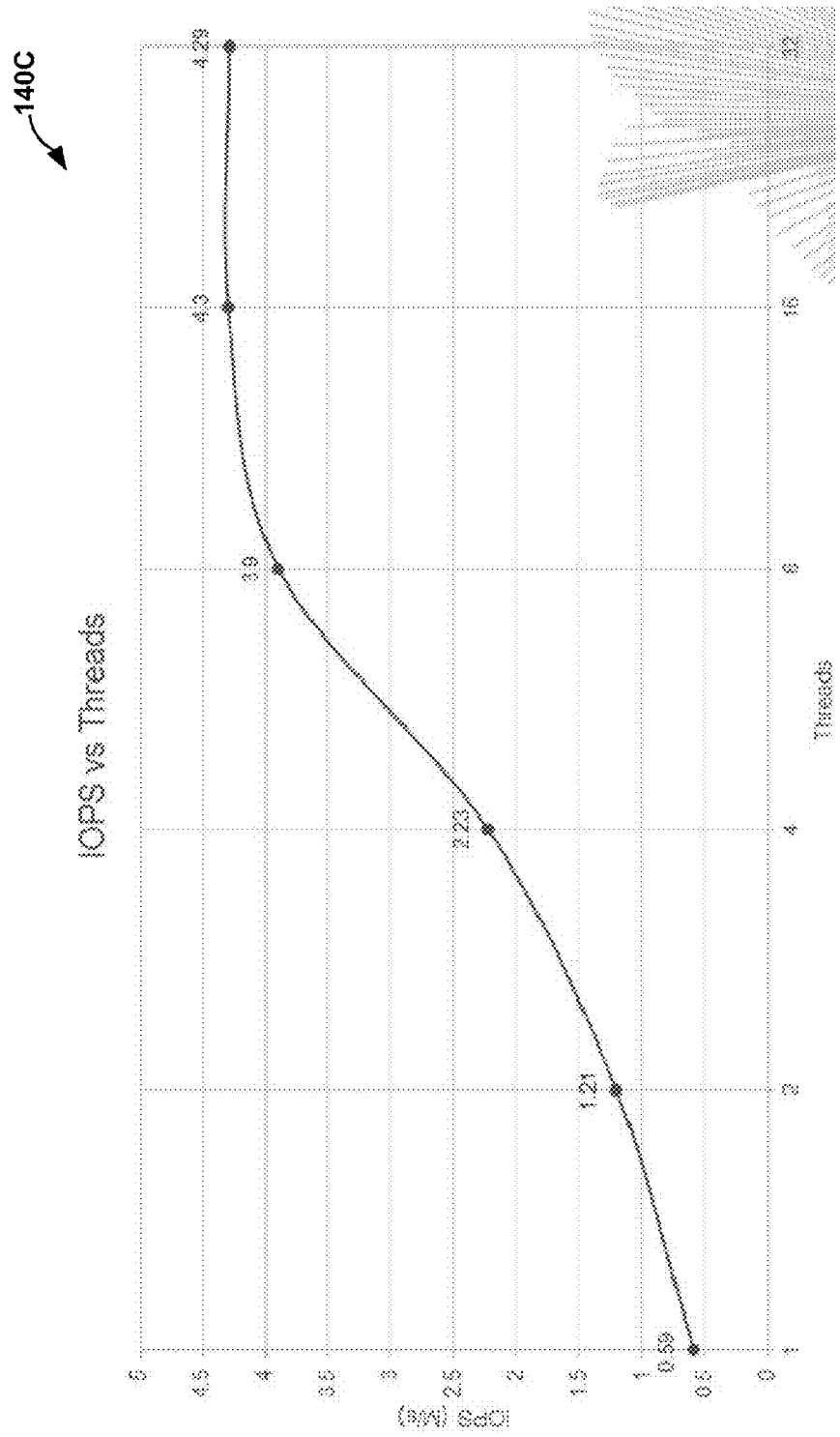
Figure 11D:
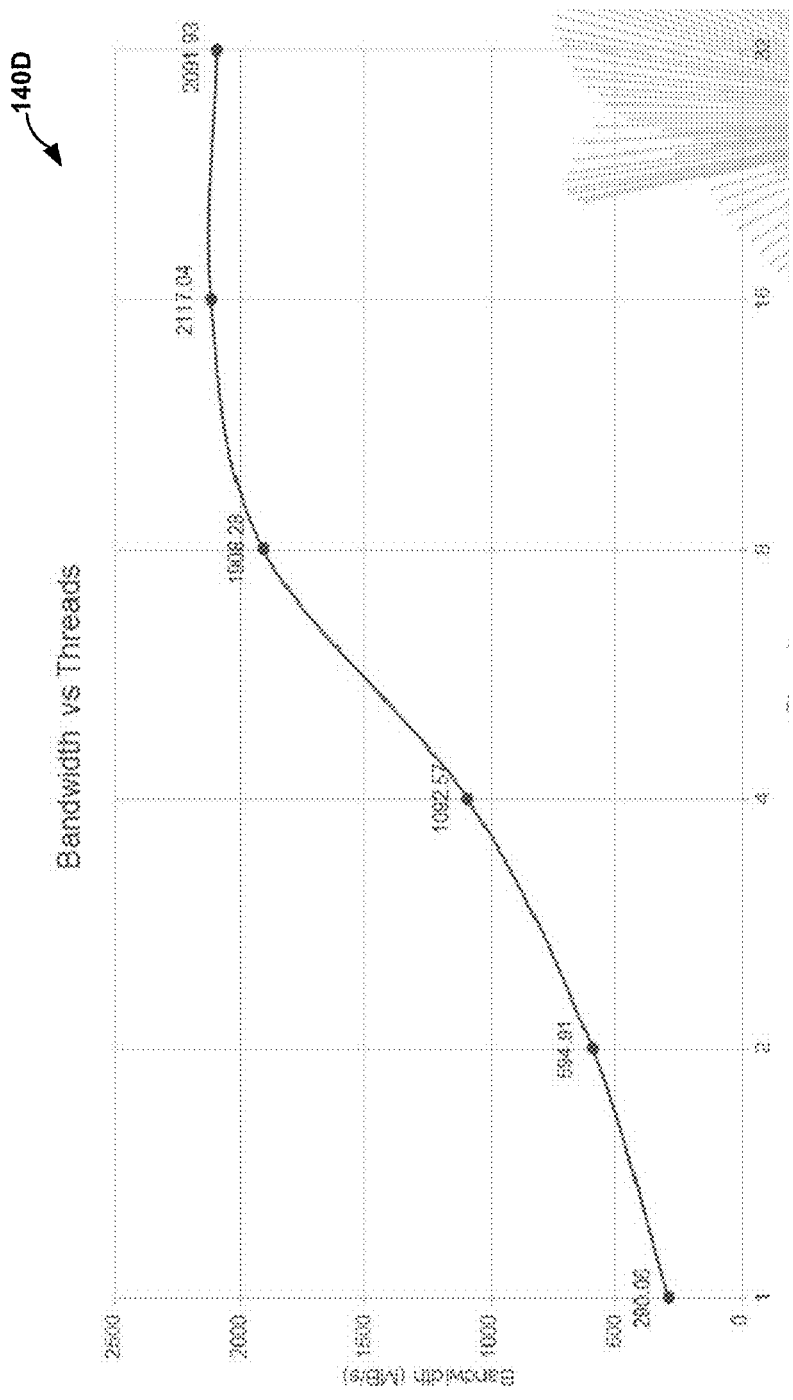

In FIG. 11B, graph 140B shows the impact of the techniques to bandwidth (Y-axis) as a function of block size (X-axis), where bandwidth increases as block size increases. In FIG. 11C, graph 140C shows the impact of the techniques to IOPS (Y-axis) as a function of threads (512 bytes, X-axis), where IOPS increases as the threads increase until 8 and higher threads at which point IOPS plateaus. In FIG. 11D, graph 140D shows the impact of the techniques to bandwidth (Y-axis) as a function of threads (512 bytes, X-axis), where bandwidth increases as the threads increase until 8 and higher threads at which point bandwidth plateaus.

Figure 11E:
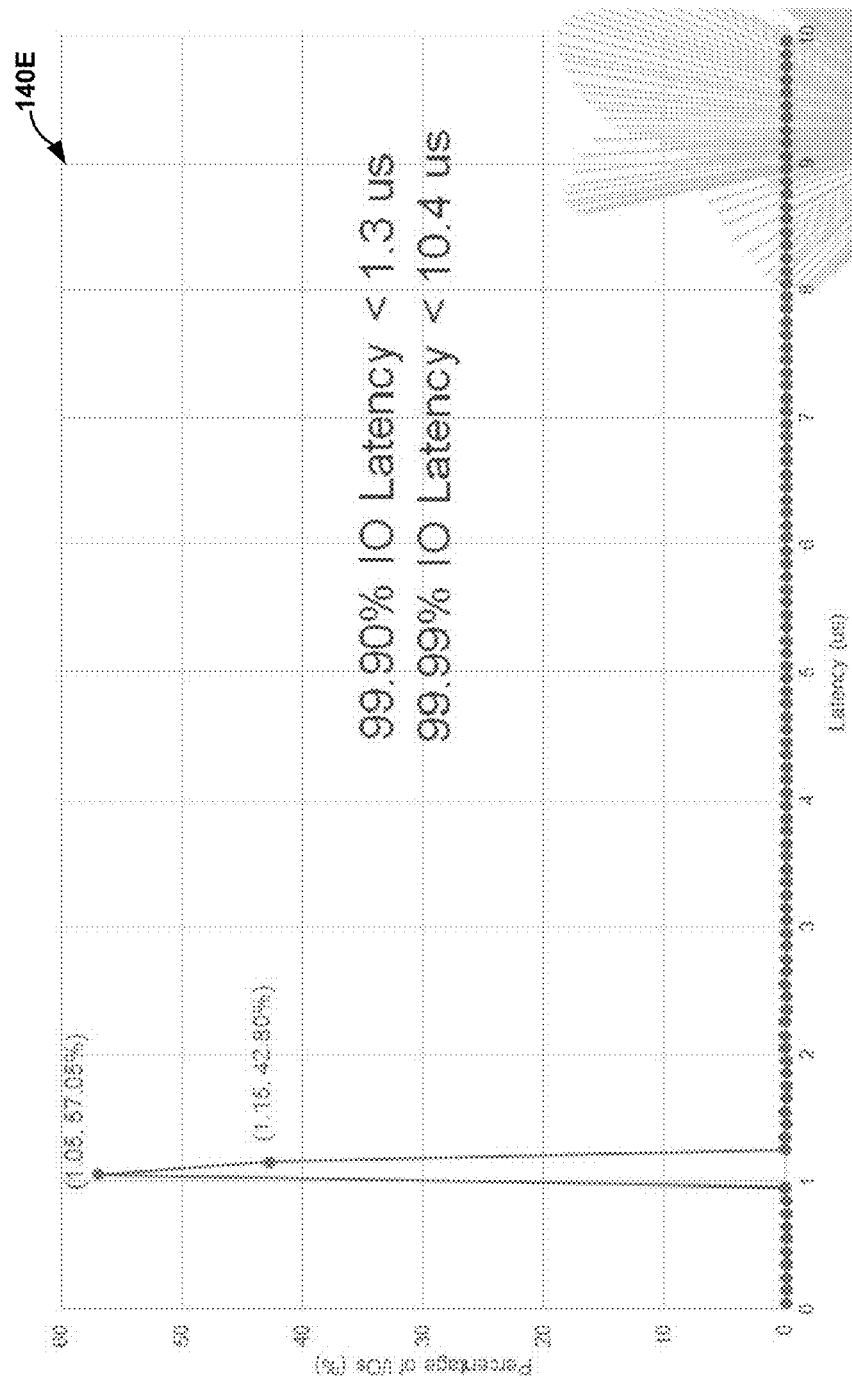
Figure 11F:
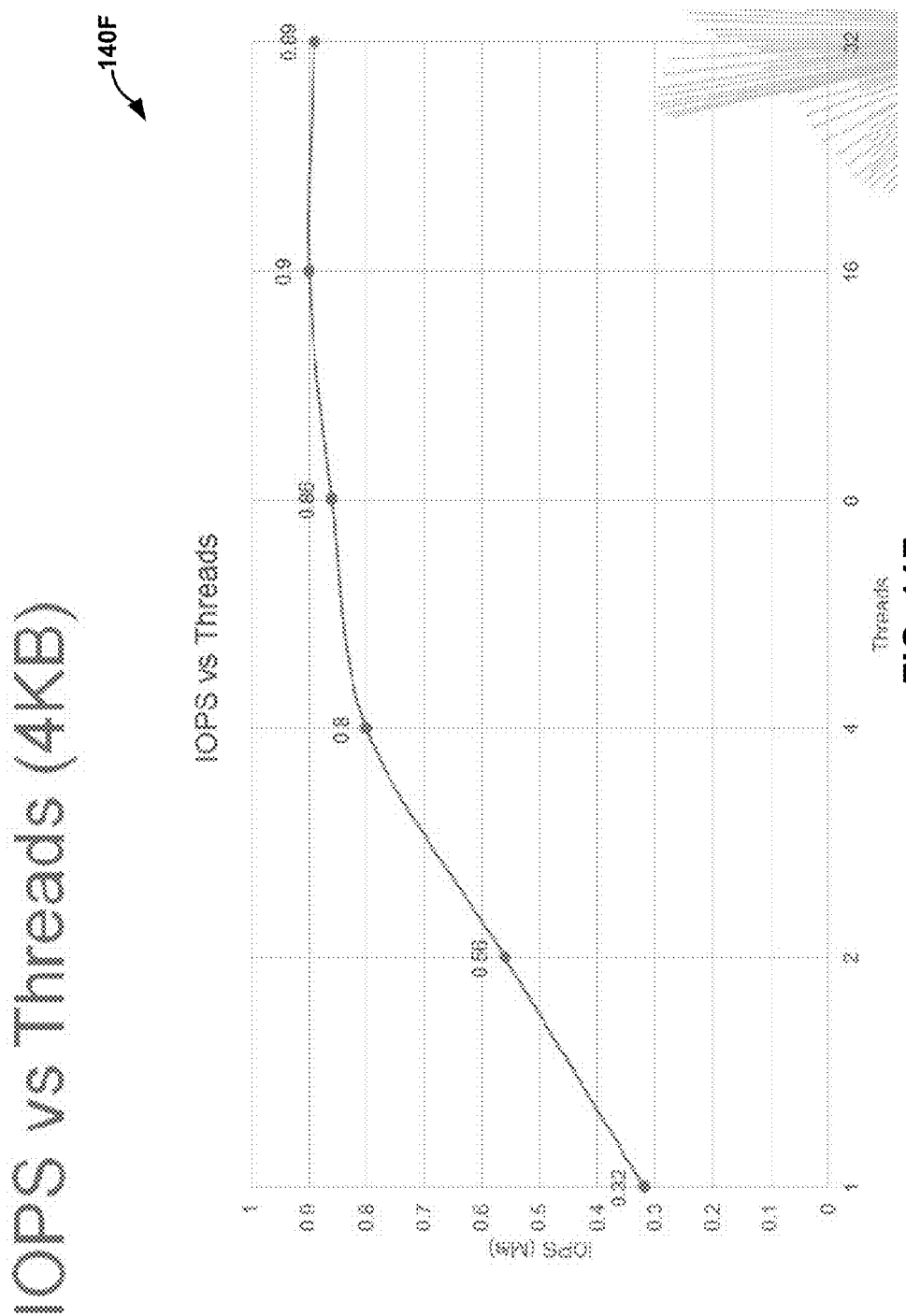
Figure 11G:
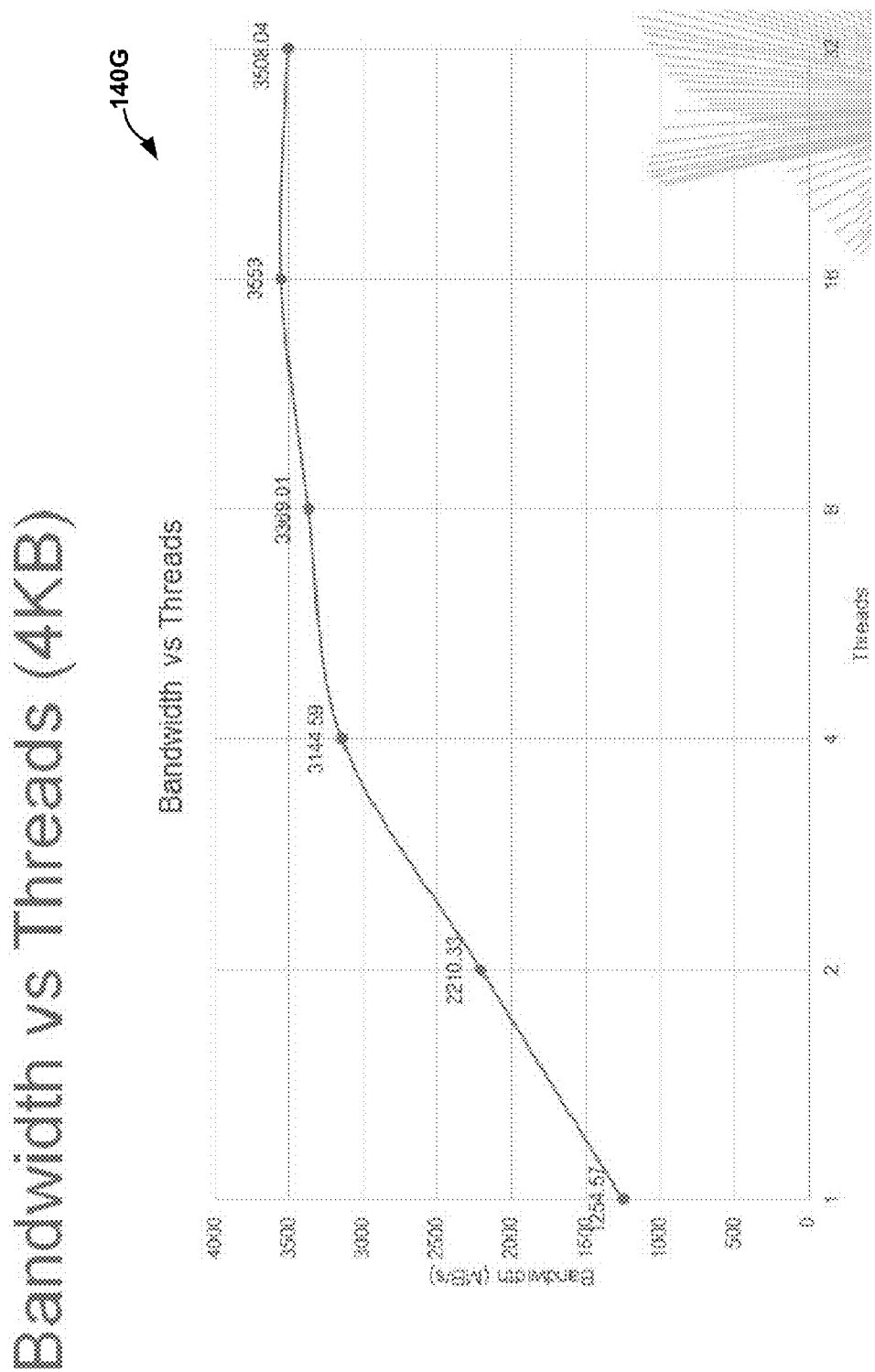

In FIG. 11E, graph 140E shows the impact of the techniques to latency distribution (Y-axis) for 512 byte accesses (X-axis). In FIG. 11F, graph 140F shows the impact of the techniques to IOPS (Y-axis) as a function of threads (4 kilobytes, X-axis), where IOPS increases as the threads increase until 8 and higher threads at which point IOPS plateaus. In FIG. 11G, graph 140G shows the impact of the techniques to bandwidth (Y-axis) as a function of threads (4 kilobytes, X-axis), where bandwidth increases as the threads increase until 4 and higher threads at which point bandwidth mostly plateaus.

In this respect, the techniques of this disclosure may provide for storage device 6 comprising non-volatile memory and a hardware controller 8 (e.g., in terms of the FSMs described herein). Hardware controller 8 may be configured to provide a direct communication channel (e.g., thread communication channel 40) between one or more threads executed by one or more processors of host device 4 and hardware controller 8 for purposes of issuing access requests to read data from and write data to the non-volatile memory.

Figure 12:
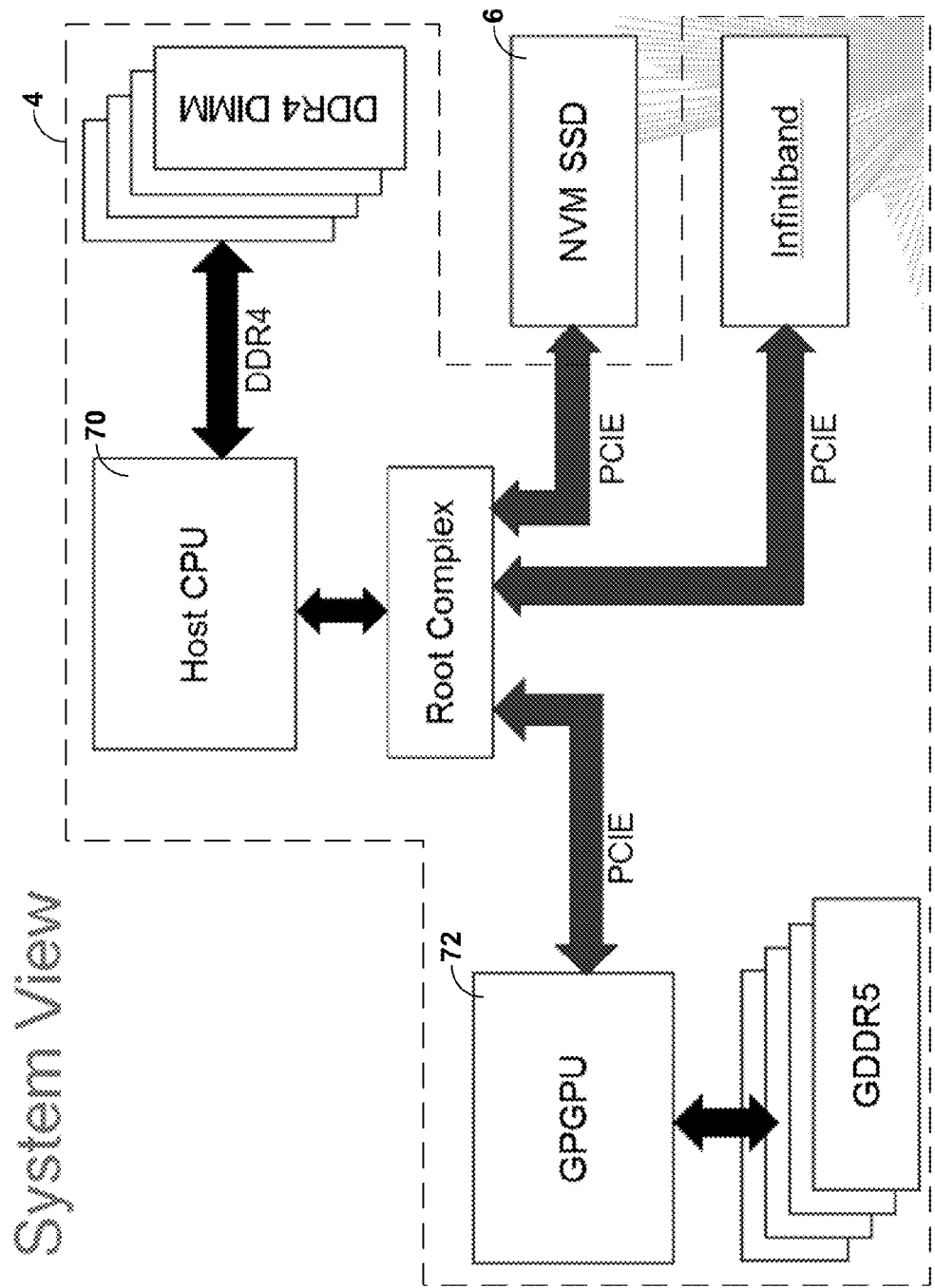
FIG. 12 is a diagram illustrating a system level view of the storage environment shown in FIG. 1.

Various aspects of the above techniques may also be adapted to promote communication directly between general purpose graphics processing units (GPGPUs) and storage devices. FIG. 12 is a diagram illustrating a system level view of storage environment 2 shown in FIG. 1. In the example of FIG. 12, host 4 includes a host CPU 70 communicatively coupled to a GPGPU 72 and storage device 6 (which is shown as "NVM SSD 6"). GPGPU 72 may also be communicatively coupled to storage device 6.

Figure 13:
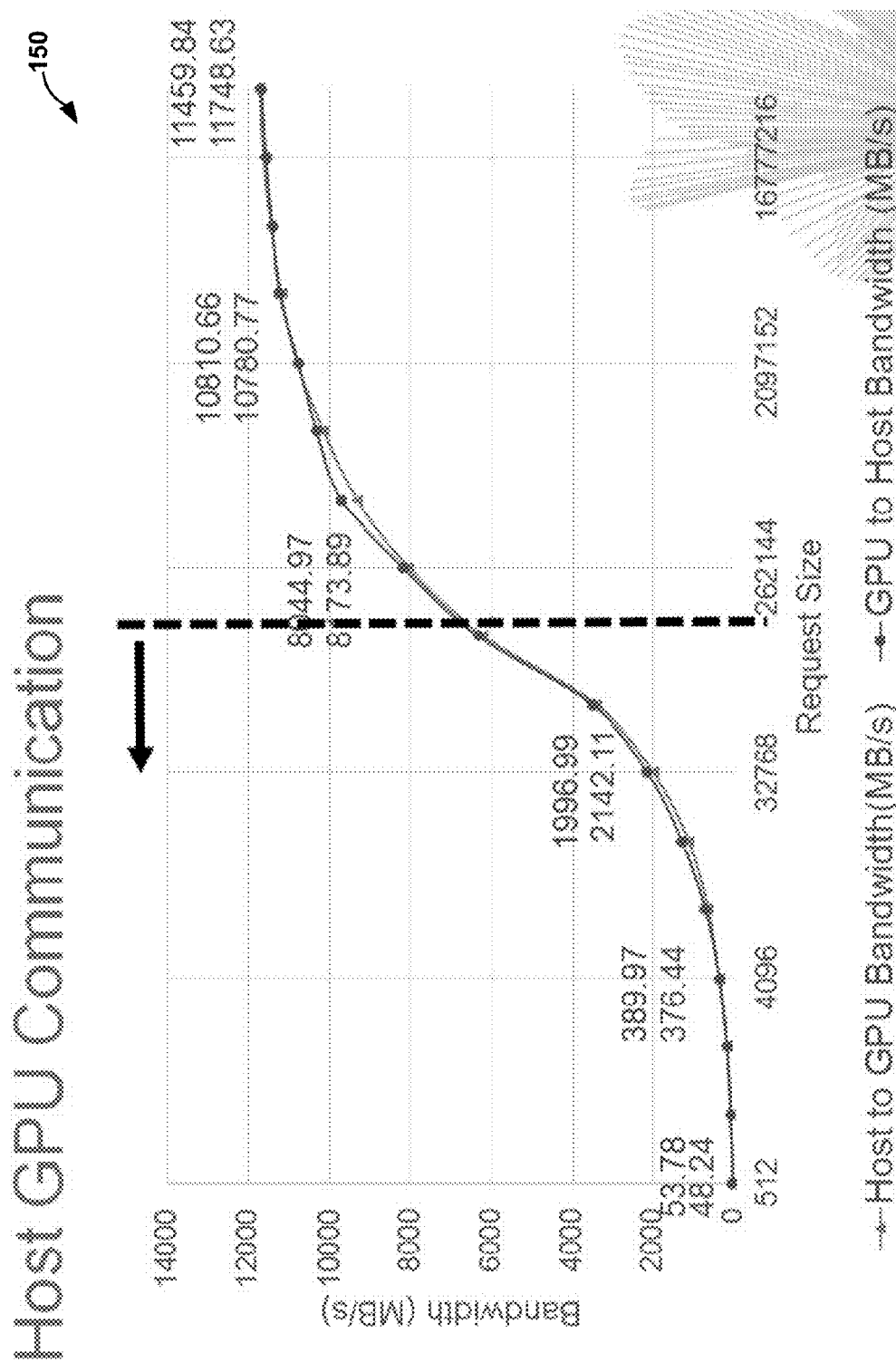
FIG. 13 is a diagram illustrating a graph of bandwidth utilized by the host and GPU for communication as a function of request size.

FIG. 13 is a diagram illustrating a graph 150 of bandwidth (Y-axis) utilized by host 4 and GPU 72 for communication as a function of request size (X-axis). In some systems, CPU 70 acts as the conduit by which all data to GPGPU 72 from storage device 6 and from GPGPU 72 to storage device 6 passes. Graph 150 illustrates that the having all data run through CPU 70 may consume large amounts of bandwidth. Given the growing shift to using GPGPU 72 to accelerate large scale data parallel applications, the growth in bandwidth consumption will likely grow. Moreover, GPGPUs enable energy efficient high performance computing, which further increases the likeliness of the move toward using GPGPUs more for general purpose computing.

GPUDirect is a mechanism that provides access to GPU pinned memory from the device kernel driver (which may be another way to refer to device driver 104 shown in the example of FIG. 2). NVMs may reduce the performance gap between the I/O and the host and GPU communication (e.g., by providing I/O latency of 1.13 microseconds (μs) and bandwidth of 2.03 GB/s for 512 bytes where in contrast host-GPU latency is 10 microseconds and bandwidth is 50 MB/s for 512 bytes). NVMs may shift the bottleneck form storage device 6 to interface, driver and software.

Figure 14:
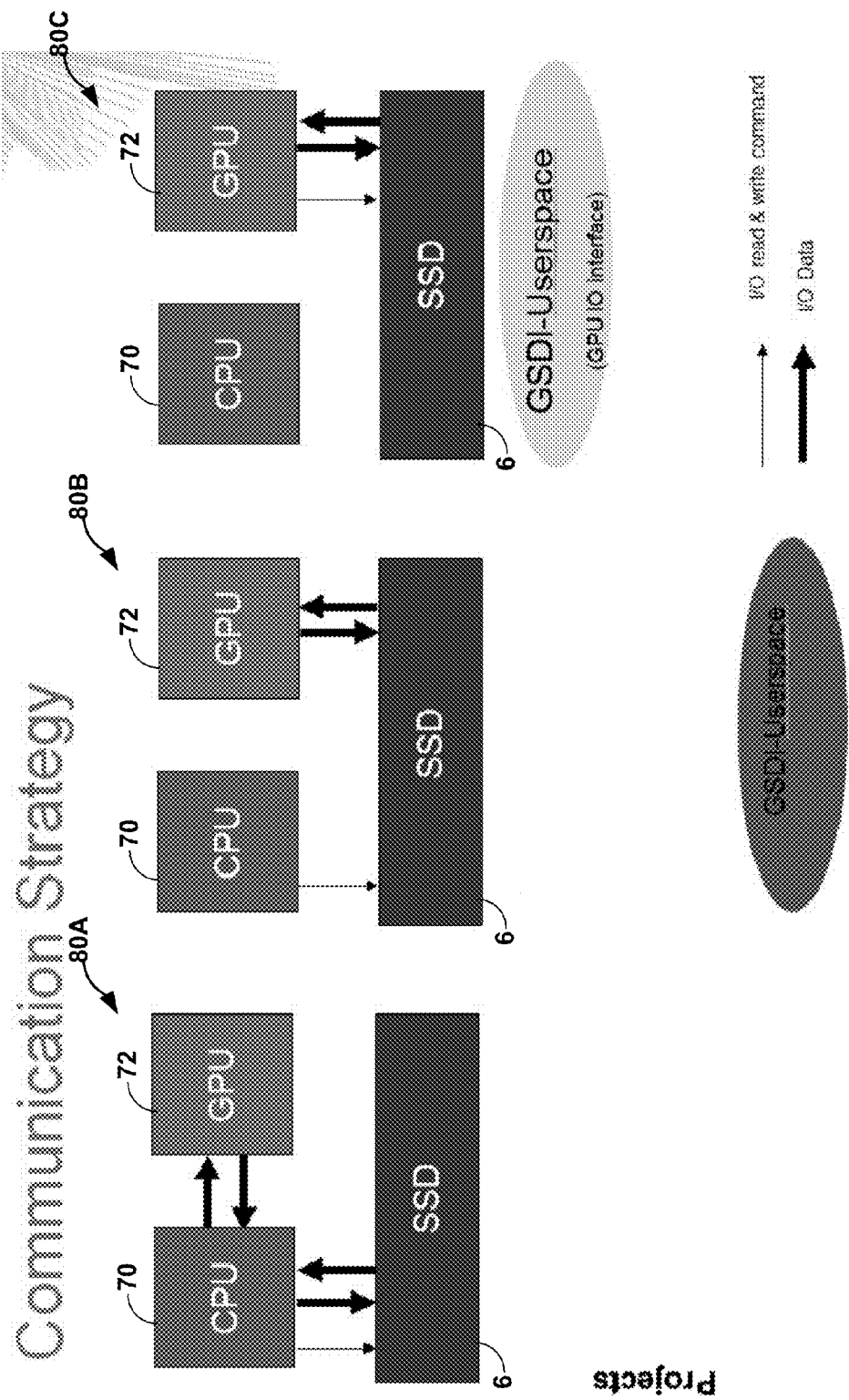
FIG. 14 is a diagram illustrating three different architectures by which communication may occur between a central processing unit (CPU), a graphics processing unit (GPU) and a solid state drive (SSD).

FIG. 14 is a diagram illustrating three different architectures 80A-80C by which communication may occur between CPU 70, GPU 72 and SSD 6. In architecture 80A, all communication occurs through CPU 70. In architecture 80B enabled by way of various aspects of the techniques described in this disclosure (shown as "GSDI-Userspace"), CPU 70 may instruct SSD 6 to read or write data by issuing the I/O read and write commands, while GPU 72 may receive the data and provide the data directly from and directly to SSD 6. In architecture 80C also enabled by way of various aspects of the techniques described in this disclosure (shown as "GSDI-Userspace"), GPU 72 may instruct SSD 6 to read or write data by issuing the I/O read and write commands and also GPU 72 may receive the data and provide the data directly from and directly to SSD 6.

As noted above, the techniques may provide a thread communication channel, which may be adapted to accommodate GPGPU 72 (and referred to in this context as a "GPU communication channel"). The GPU communication channel may comprise a GPU pinned upstream buffer, a downstream buffer, a command register (PIO), a status register (PIO) and a control structure. Similar to the thread communication channel, the GPU communication channel may provide lock-free communication between a GPU thread and SSD 6, while also potentially eliminating multiple copies of data from SSD 6 to system memory and then from system memory to the GPU memory and reducing context switching between the kernel and application space. Again, similar to the thread communication channel, the GPU communication channel may reduce latency and improve bandwidth, while also potentially reducing CPU utilization and avoiding main memory usage.

Figure 15:
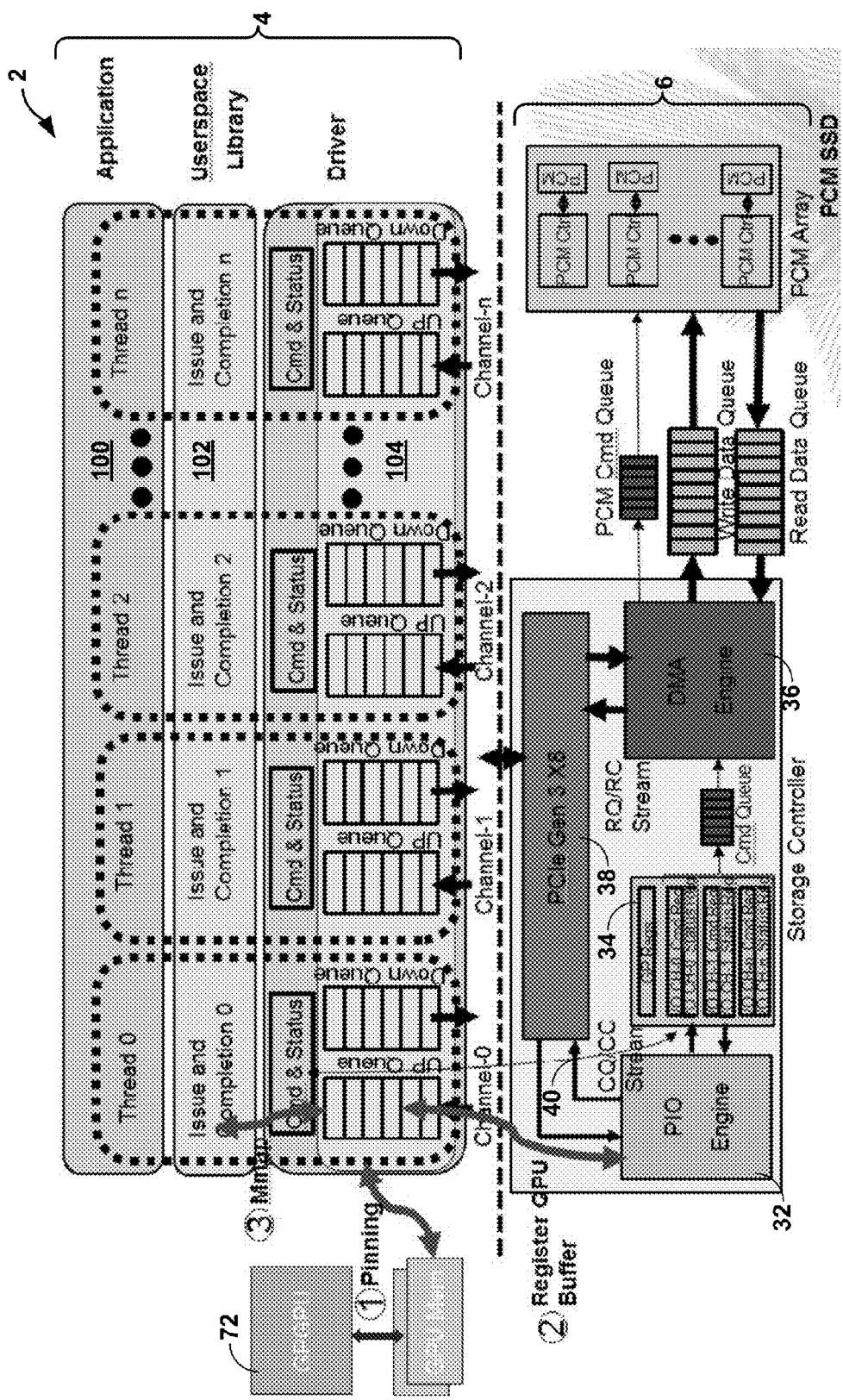
FIG. 15 is a diagram illustrating storage environment of FIG. 3 updated to include the GPU communication thread.

FIG. 15 is a diagram illustrating storage environment 2 of FIG. 3 updated to include the GPU communication thread. The techniques may augment the existing driver, userspace library, and SSD hardware to provide direct communication between SSD 6 and GPGPU 72. The techniques may also integrate with the GPU driver to pin and unpin GPU memory in kernel space. During initialization, the following may be performed:

Pinned GPU memory: for direct data communication between SSD and GPU memory;
Register GPU physical pages to SSD: To perform DMA directly to the GPU memory; and
Mmap GPU memory to application space: for polling to indicate completion.

Host 4 may issue I/O requests and notify of request completions.

Figure 16:
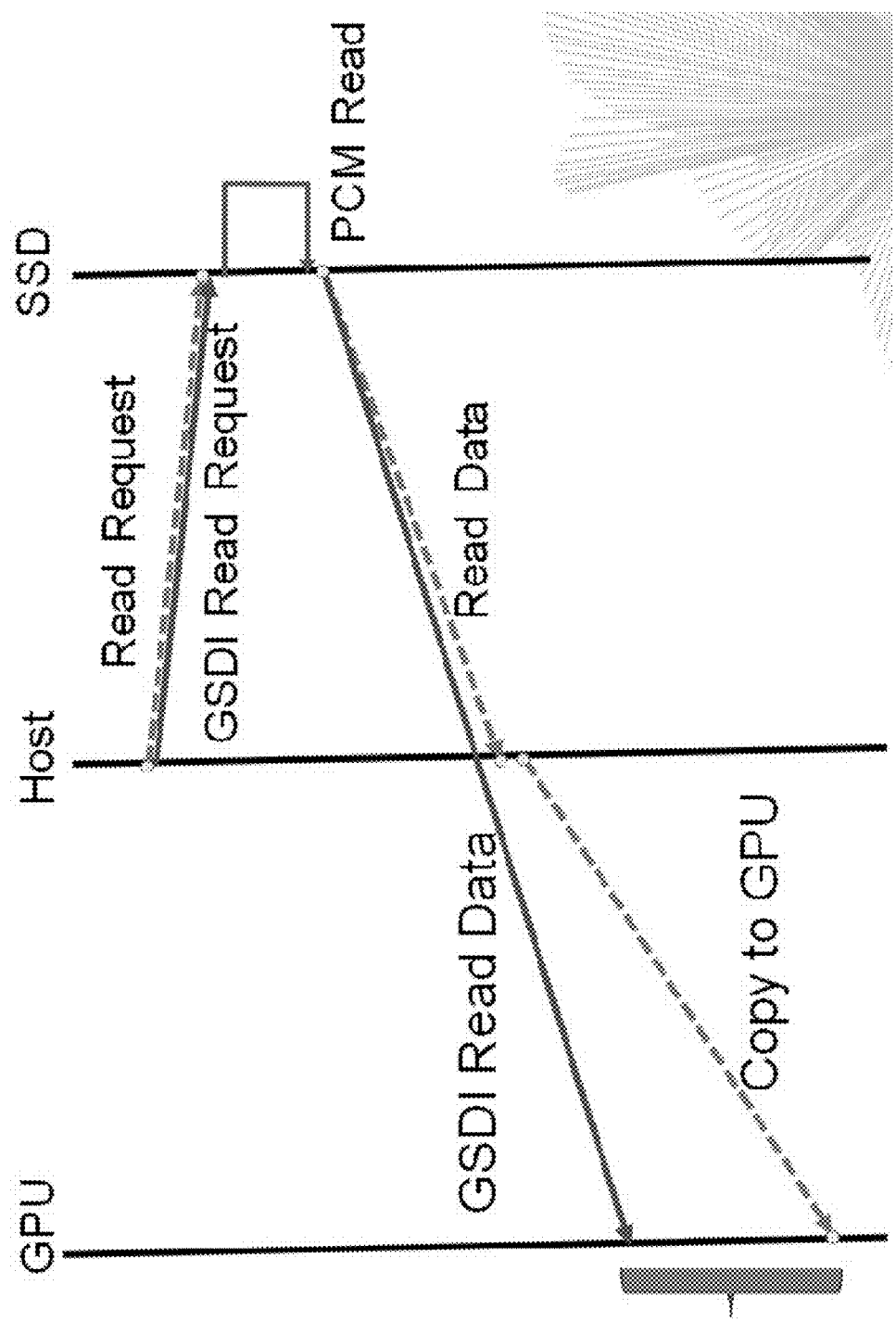
FIG. 16 is a diagram illustrating the above read shown in FIG. 9 in comparison to the read performed in accordance with the direct GPU read techniques described in this disclosure.

FIG. 16 is a diagram illustrating the above read shown in FIG. 9 in comparison to the read performed in accordance with the direct GPU read techniques described in this disclosure. The read of FIG. 8 is shown as a dashed line. As shown in the FIG. 16, the direct GPU read may reduce latency by 8.28 microseconds for 512 byte thread.

The following provides exemplary additions to the API that host 4 may expose for use by applications to access the interface architecture shown in FIG. 3 and thereby operate in accordance with the techniques described in this disclosure.

sscc_gpu_mem_init (struct pin_buf* buf, uin64_t size): Allocate and pin GPU memory
sscc_gpu_mem_exit (struct pin_buf* buf): Unpin and free GPU memory
sscc_gpu_read(sscc_channel_t* channel, void* buf, void* nvm_addr, uint64_t size): Read size data from nvm_addr through given channel and put it in buffer; and
sscc_gpu_write(sscc_channel_t* channel, void* buf, void* nvm_addr, uint64_t size): Write size data from buf to nvm through given channel.

The techniques may additionally provide, in this respect, that the one or more processors may comprise a central processing unit, a graphics processing unit or both the central processing unit and the graphics processing unit.

Figure 17B:
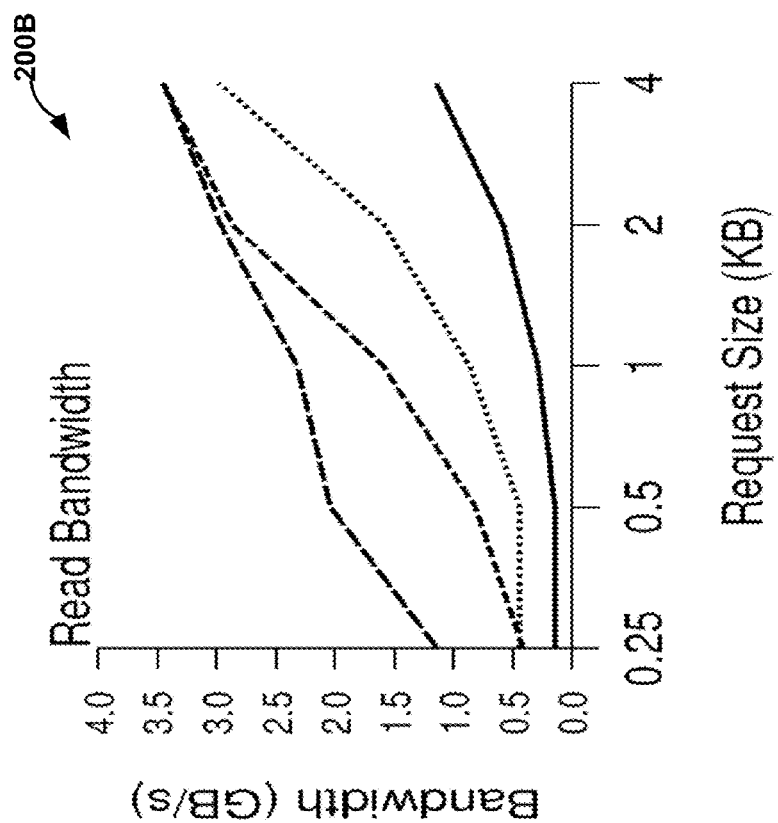
FIGS. 17A and 17B are diagrams each illustrating a graph showing various improvements potentially provided by various aspects of the techniques of this disclosure.
Figure 17A:
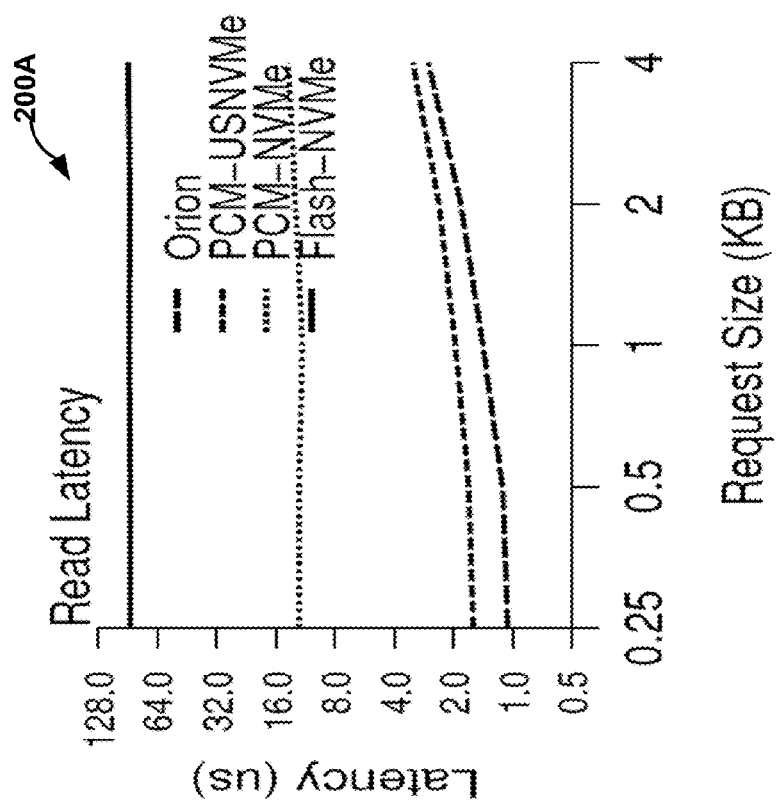

The following components may be utilized to perform the techniques described in this disclosure:
NVRAM-32i card
PCIe Gen 3.0 X8 host connection
Clock frequency 250 MHz
Virtex 7 FPGA implements
PCIe Bridge
PCM LPDDR2 controller FIGS. 17A and 17B are diagrams each illustrating a graph 200A and 200B showing various improvements potentially provided by various aspects of the techniques of this disclosure. In the example of FIG. 17A, graph 200A shows a comparison between previous architectures (e.g., PCM-USNVMe, PCM-NVMe, Flash-NVMe) and the architecture provided by the techniques of this disclosure (e.g., Orion) in terms of latency (Y-axis) as a function of request size in KB (X-axis). The Orion architecture provide by way of the techniques described in this disclosure may provide up to a 30% improvement in terms of latency for various requests sizes (e.g., a latency of 1.13 microseconds for a request size of 0.5 KB for the Orion architecture in comparison to a latency of 1.5 microseconds for a request size of 0.5 KB for the PCM-USNVMe architecture).

In the example of FIG. 17B, graph 200B shows a comparison between previous architectures (e.g., PCM-USNVMe, PCM-NVMe, Flash-NVMe) and the architecture provided by the techniques of this disclosure (e.g., Orion) in terms of bandwidth (Y-axis) as a function of request size in KB (X-axis). The Orion architecture provide by way of the techniques described in this disclosure may provide up to a 58% improvement in terms of bandwidth for various requests sizes (e.g., a bandwidth of 2.03 GB/second for a request size of 0.5 KB for the Orion architecture in comparison to a bandwidth of 0.8 GB/s for a request size of 0.5 KB for the PCM-USNVMe architecture).

Figure 18:
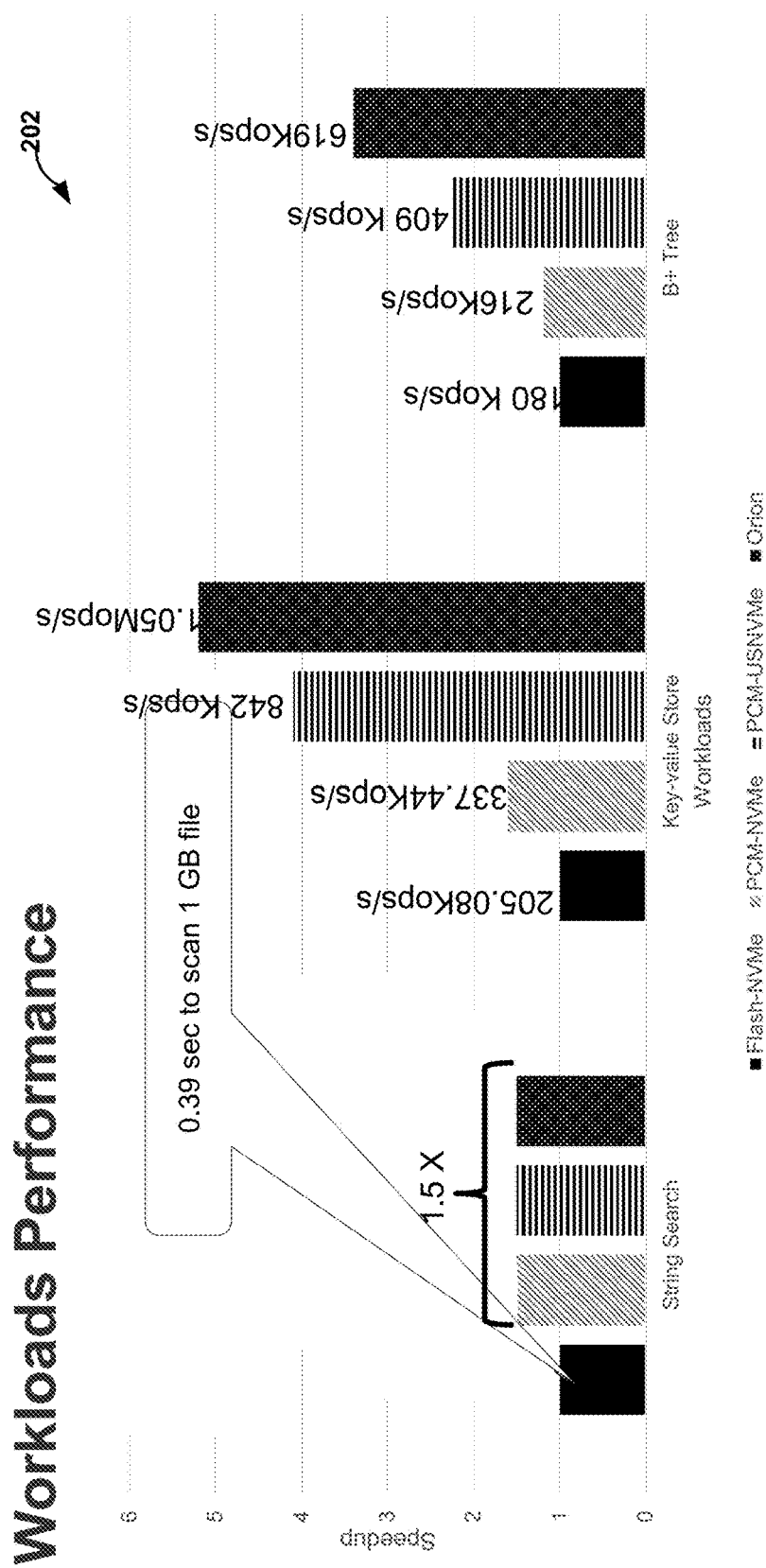
FIG. 18 is a diagram illustrating a graph showing various improvements potentially provided by various aspects of the techniques of this disclosure.

FIG. 18 is a diagram illustrating a graph 202 showing various improvements potentially provided by various aspects of the techniques of this disclosure. Graph 202 shows speedup of various operations (e.g., a string search operation, a key-value store operation—in terms of workload, and a B+ tree operation). The Orion architecture provided by way of the techniques described in this disclosure maintains the speed up of previous architecture (e.g., PCM-USNVMe, PCM-NVMe, Flash-NVMe) for string search operations, while providing improved speedup for key-value store operations and B+ tree operations (which is an example of a tree data structure traversal operation).

FIG. 19 is a flowchart illustrating example operation of system 2 shown in FIG. 3 in performing various aspects of the techniques described in this disclosure. In the example of FIG. 19, host device 4 may be (which may include one or more processors) configured to allocate registers for each thread to provide a direct communication channel 40 between each thread and hardware controller 8 of storage device 6 (210). Host device 4 may further be configured to execute threads to send commands via direct communication channels 40 to hardware controller 8 (212). Host device 4 may be configured to execute the threads to send the commands via a PIO interface of direct communication channels 40.

As such, hardware controller 8 of storage device 6 may be configured to receive the commands via direct communication channels 40 (via, as one example, the PIO interface of direct communication channels 40) (214). DMA engine 36 of hardware controller 8 may be configured to service the commands. DMA engine 36, when servicing the commands stored to hardware queue 34, issue access requests based on the commands to read data from or write data to non-volatile memory 10 (216). DMA engine 36 may write the data read from non-volatile memory 10 or read the data to be written to non-volatile memory 10 using a DMA interface of direct communication channels 40. Host device 4 may further be configured to execute the threads to provide the data to be written to non-volatile memory 10 or receive the data read from the non-volatile memory (so-called "read data") via direct communication channels 40 (for example, via the DMA interface of direct communication channels 40) (218).

FIG. 20 is a flowchart illustrating example operation of the storage device 6 shown in FIG. 3 in performing various aspects of the techniques described in this disclosure. In the example of FIG. 20, hardware controller 8 of storage device 6 may be configured to read data from or write data to registers allocated by host device 4 to provide direct communication channel 40 between each thread executed by host device 4 and hardware controller 8 (230). Hardware controller 8 may also be configured to send the commands received via direct communication channel 40 to hardware queue 34 (232). Hardware controller 8 may further be configured to issue access requests based on the commands to read data from or write data to non-volatile memory 10 (234).

FIG. 21 is a flowchart illustrating example operation of the host device shown in FIG. 3 in performing various aspects of the techniques described in this disclosure. In the example of FIG. 21, host device 4 may be (where host device 4 may include one or more processors) configured to allocate data registers to provide direct communication channel 40 between each thread executed by the one or more processors and hardware controller 8 of storage device 6 (240). The one or more processors of host device 4 may be configured to execute one or more threads to both send commands via direct communication channel 40 to hardware controller 8, and directly read data from or write data to, based on the commands, non-volatile memory 10 of storage device 6 via direct communication channel 40 (242, 244).

The techniques described in this disclosure may in this respect be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A storage device comprising:
   non-volatile memory; and
   a hard ware controller comprising a hardware programmed input/output (PIO) engine configured to perform a multi tagging scheme, a plurality of command and status registers, a hardware direct memory access (DMA) engine and an interface controller configured to:
   read from or write to one or more data registers in a host device to provide a direct communication channel between each of one or more threads executed by one or more processors of the host device and the hardware controller;
   store a plurality of commands received from the direct communication channel to a hardware queue; and
   issue access requests based on the plurality of commands to read data from or write data to the non-volatile memory.

2. The storage device of claim 1, wherein the hardware controller includes:
the hardware (PIO) engine configured to receive the plurality of commands via the direct communication channel; and
the hardware (DMA) engine configured to issue the access requests based on the plurality of commands to read the data from or write the data to the non-volatile memory and further configured to write the data read from the non-volatile memory to the host device or read the data from the host device to be written to the non-volatile memory.

3. The storage device of claim 1, wherein the one or more data registers are allocated to each of the one or more threads by a driver executed by the host device to establish the direct communication channel between each of the one or more threads and the hardware controller.

4. The storage device of claim 1, wherein the one or more processors comprise a central processing unit, a graphics processing unit, or both the central processing unit and the graphics processing unit.

5. A storage device comprising:
non-volatile memory; and
a hard ware controller configured to:
read from or write to one or more data registers in a host device to provide a direct communication channel between each of one or more threads executed by one or more processors of the host device and the hard ware controller;
store a plurality of commands received from the direct communication channel to a hardware queue; and
issue access requests based on the plurality of commands to read data from or write data to the non-volatile memory, wherein the hard ware controller includes:
a hardware programmed input/output (PIO) engine configured to receive the plurality of commands via the direct communication channel; and
a hardware (DMA) engine configured to issue the access requests based on the plurality of commands to read the data from or write the data to the non-volatile memory and further configured to write the data read from the non-volatile memory to the host device or read the data from the host device to be written to the non-volatile memory, wherein the hardware PIO engine is further configured to:
implement a multi-channel tagging scheme to assign a unique tag to each of the plurality of commands, the unique tag including a unique channel identifier and a sequence number; and
process the commands based on the unique tags to send the plurality of commands received from the direct communication channel to the hardware queue.

6. The storage device of claim 5, wherein the hardware PIO engine is configured to implement the multi-channel tagging scheme locally with respect to each direct communication channel to avoid global synchronization and locks associated with a software request queue to be shared by the one or more threads.

7. A storage device comprising:
non-volatile memory; and
a hard ware controller configured to:
read from or write to one or more data registers in a host device to provide a direct communication channel between each of one or more threads executed by one or more processors of the host device and the hard ware controller;
store a plurality of commands received from the direct communication channel to a hardware queue; and
issue access requests based on the plurality of commands to read data from or write data to the non-volatile memory, wherein the one or more threads are each allocated a respective one of the direct communication channels without implementing a software request queue having locks and atomicity and which is to be shared by the one or more threads.

8. A method comprising:
reading from or writing to, by a hardware controller of a storage device, one or more data registers in a host device to provide a direct communication channel for each of a plurality of threads executed by one or more processors of the host device, each of the direct communication channels enables direct communication between the respective one of the plurality of threads and the hardware controller;
translating, by the hardware controller, a plurality of commands received for accessing a non-volatile memory wherein the controller is configured with a hardware programmed input/output (PIO) engine configured to perform a multi tagging scheme, a plurality of command and status registers, a hardware direct memory access (DMA) engine and an interface controller;
storing, by the hardware controller, a plurality of commands received from the direct communication channel to a hardware queue; and
issuing, by the hardware controller, access requests based on the plurality of commands to read data from or write data to non-volatile memory of the storage device.

9. The method of claim 8, further comprising:
receiving, by the hardware (PIO) engine of the hardware controller, the plurality of commands via the direct communication channel; and
issuing, by the hardware (DMA) engine of the hardware controller, the access requests based on the plurality of commands to read the data from or write the data to the non-volatile memory;
writing, by the hardware (DMA) engine, the data read from the non-volatile memory to the host device or read the data from the host device to be written to the non-volatile memory.

10. The method of claim 8, wherein the one or more data registers are allocated to each of the plurality of threads by a driver executed by the host device to establish the direct communication channel between each of the plurality of threads and the hardware controller.

11. A method comprising:
reading from or writing to, by a hardware controller of a storage device, one or more data registers in a host device to provide a direct communication channel for each of a plurality of threads executed by one or more processors of the host device, each of the direct communication channels enables direct communication between the respective one of the plurality of threads and the hardware controller;
storing, by the hardware controller, a plurality of commands received from the direct communication channel to a hardware queue;
issuing, by the hardware controller, access requests based on the plurality of commands to read data from or write data to non-volatile memory of the storage device;
receiving, by a hardware programmed input/output (PIO) engine of the hardware controller, the plurality of commands via the direct communication channel;

issuing, by a hardware (DMA) engine of the hardware engine, the access requests based on the plurality of commands to read the data from or write the data to the non-volatile memory;

writing, by the hardware DMA engine, the data read from the non-volatile memory to the host device or read the data from the host device to be written to the non-volatile memory, implementing, by the hardware PIO engine, a multi-channel tagging scheme to assign a unique tag to each of the plurality of commands, the unique tag including a unique channel identifier and a sequence number; and processing, by the hardware PIO engine, the commands based on the unique tags to send the plurality of commands received from the direct communication channel to the hardware queue.

12. The method of claim 11, wherein implementing the multi-channel tagging scheme comprising implementing the multi-channel tagging locally with respect to each direct communication channel to avoid global synchronization and locks associated with a software request queue to be shared by the plurality of threads.

13. A method comprising:

reading from or writing to, by a hardware controller of a storage device, one or more data registers in a host device to provide a direct communication channel for each of a plurality of threads executed by one or more processors of the host device, each of the direct communication channels enables direct communication between the respective one of the plurality of threads and the hardware controller;

storing, by the hardware controller, a plurality of commands received from the direct communication channel to a hardware queue; and issuing, by the hardware controller, access requests based on the plurality of commands to read data from or write data to non-volatile memory of the storage device, wherein each of the plurality of threads is allocated a respective one of the direct communication channels without implementing a software request queue having locks and atomicity and which is to be shared by the plurality of threads.

14. A host device communicatively coupled to a storage device, the host device comprising:
an application;
a user space library;
a device driver;
one or more data registers; and
one or more processors configured to:
allocate the one or more data registers for each of one or more threads to provide a direct communication channel between each of the one or more threads and a hardware controller of the storage device the controller comprising a hardware programmed input/output (PIO) engine configured to perform a multi tagging scheme, a plurality of command and status registers, a hardware direct memory access (DMA) engine and an interface controller; and
execute the one or more threads to send a plurality of commands directly to a hardware queue via the direct communication channel, and directly read data from or directly write data to, in response to sending the plurality of commands, non-volatile memory of the storage device via the direct communication channel.

15. The host device of claim 14, further comprising a memory, wherein the one or more processor are further configured to allocate one or more queues within the memory for each of the one or more threads to establish the direct communication channel, the one or more queues allocated in a userspace of the memory to facilitate reading of the data from or writing of data to the non-volatile memory.

16. The host device of claim 14, wherein the one or more processors execute the one or more threads to send the plurality of commands via programmed input/output (PIO) interface of the direct communication channel, and directly read data from or directly write data to the non-volatile memory via a direct memory access (DMA) interface of the direct communication channel.

17. The host device of claim 14, wherein the one or more processors execute a driver to allocate the one or more data registers to each of the one or more threads to establish the direct communication channel between each of the one or more threads and the hardware controller.

18. The host device of claim 14, wherein the one or more processors comprise a central processing unit, a graphics processing unit or both the central processing unit and the graphics processing unit.

19. A host device communicatively coupled to a storage device, the host device comprising:
one or more data registers; and
one or more processors configured to:
allocate the one or more data registers for each of one or more threads to provide a direct communication channel between each of the one or more threads and a hardware controller of the storage device; and
execute the one or more threads to send a plurality of commands directly to a hardware queue via the direct communication channel, and directly read data from or directly write data to, in response to sending the plurality of commands, non-volatile memory of the storage device via the direct communication channel, wherein the one or more processors execute a driver to allocate each of the one or more threads a respective one of the direct communication channels without implementing a software request queue having locks and atomicity and which is to be shared by the one or more threads.

20. A method comprising:
allocating, by one or more processors of a host device, one or more data registers for each of a plurality of threads to provide a direct communication channel for each of the plurality of threads, each of the direct communication channels enables direct communication between the respective one of the plurality of threads and a hardware controller of a storage device wherein the controller comprising a hardware programmed input/output (PIO) engine configured to perform a multi tagging scheme, a plurality of command and status registers, a hardware direct memory access (DMA) engine and an interface controller; and
executing, by the one or more processors, the plurality of threads to send a plurality of commands directly to a hardware queue via the direct communication channel, and directly read data from or directly write data to, in response to sending the plurality of commands, non-volatile memory of the storage device via the direct communication channel.

21. The method of claim 20, further comprising allocating one or more queues within the memory for each of the plurality of threads to establish the direct communication channel, the one or more queues allocated in a userspace of the memory to facilitate reading of the data from or writing of data to the non-volatile memory.

22. The method of claim 20, wherein executing the plurality of threads comprises executing the plurality of threads to send the plurality of commands via a programmed input/output (PIO) interface of the direct communication channel, and directly read data from or directly write data to the non-volatile memory via a direct memory access (DMA) interface of the direct communication channel.

23. The method of claim 20, further comprising executing, by the one or more processors, a driver to allocate the one or more data registers to each of the plurality of threads to establish the direct communication channel between each of the plurality of threads and the hardware controller.

24. The method of claim 20, wherein the one or more processors comprise a central processing unit, a graphics processing unit or both the central processing unit and the graphics processing unit.

25. A method comprising:
allocating, by one or more processors of a host device, one or more data registers for each of a plurality of threads to provide a direct communication channel for each of the plurality of threads, each of the direct communication channels enables direct communication between the respective one of the plurality of threads and a hardware controller of a storage device; and
executing, by the one or more processors, the plurality of threads to send a plurality of commands directly to a hardware queue via the direct communication channel, and directly read data from or directly write data to, in response to sending the plurality of commands, non-volatile memory of the storage device via the direct communication channel, further comprising executing, by the one or more processors, a driver to allocate each of the plurality of threads a respective one of the direct communication channels without implementing a software request queue having locks and atomicity and which is to be shared by the plurality of threads.

26. A system comprising:
a storage device comprising:
non-volatile memory; and
a hardware controller comprising a hardware PIO engine configured to perform a multi tagging scheme, a plurality of command and status registers, a hardware DMA engine and an interface controller; and
a host device including:
one or more data registers; and
one or more processors configured to allocate the one or more data registers for each of one or more threads to provide a direct communication channel between each of the one or more threads and the hardware controller of the storage device; and
execute the one or more threads to send a plurality of commands directly to a hardware queue via the direct communication channel so as to directly read data from or directly write data to, in response to sending the plurality of commands, non-volatile memory of the storage device via the direct communication channel, wherein the hardware controller is configured to:
send the plurality of commands received from the direct communication channel into a hardware queue; and
issue access requests based on the plurality of commands to read the data from or write the data to the non-volatile memory.

* * * * *